(12) United States Patent
Nichols et al.

(10) Patent No.: US 11,010,408 B2
(45) Date of Patent: May 18, 2021

(54) HYDRATION OF A HIERARCHY OF DEHYDRATED FILES

(71) Applicant: Microsoft Technology Licensing, LLC, Redmond, WA (US)

(72) Inventors: Jack Nichols, Redmond, WA (US); Bill Sproule, Redmond, WA (US); Brian David Jones, Woodinville, WA (US); Valeh Valiollah Pour Amiri, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 16/127,147

(22) Filed: Sep. 10, 2018

(65) Prior Publication Data

US 2019/0370378 A1 Dec. 5, 2019

Related U.S. Application Data

(60) Provisional application No. 62/679,670, filed on Jun. 1, 2018.

(51) Int. Cl.

| *G06F 16/27* | (2019.01) |
| *G06F 9/48* | (2006.01) |
| *H04L 29/08* | (2006.01) |
| *G06F 16/178* | (2019.01) |
| *G06F 16/185* | (2019.01) |

(52) U.S. Cl.
CPC ............ *G06F 16/273* (2019.01); *G06F 9/485* (2013.01); *G06F 16/178* (2019.01); *G06F 16/185* (2019.01); *H04L 67/1097* (2013.01)

(58) Field of Classification Search
CPC .... G06F 16/273; G06F 16/178; G06F 16/185; G06F 9/485; G06F 16/27; H04L 67/1097
USPC .......................................................... 707/610
See application file for complete search history.

(56) References Cited

U.S. PATENT DOCUMENTS

| 9,166,866 | B2 | 10/2015 | Novak et al. | |
| 9,552,363 | B2 | 1/2017 | Novak et al. | |
| 2006/0010154 | A1* | 1/2006 | Prahlad | ............... H04L 67/1097 |
| 2009/0193107 | A1* | 7/2009 | Srinivasan | .......... H04L 67/1095 |
| | | | | 709/223 |
| 2014/0172783 | A1* | 6/2014 | Suzuki | ..................... G06F 8/63 |
| | | | | 707/609 |
| 2014/0324945 | A1 | 10/2014 | Novak et al. | |
| 2018/0004831 | A1* | 1/2018 | Smith | ..................... G06F 16/27 |
| 2018/0025021 | A1 | 1/2018 | Jain et al. | |
| 2018/0039652 | A1 | 2/2018 | Nichols | |

(Continued)

OTHER PUBLICATIONS

"Dropbox", Retrieved from: https://www.dropbox.com/help/files-folders/viewer-information, Retrieved on: May 18, 2018, 4 Pages.

(Continued)

*Primary Examiner* — Robert W Beausoliel, Jr.
*Assistant Examiner* — Arthur Ganger
(74) *Attorney, Agent, or Firm* — Newport IP, LLC; Han Gim

(57) ABSTRACT

A request for an operation on a directory is received that requires a hydration of one or more files within the directory. A process is initiated to hydrate dehydrated descendent files of the folder. During the hydration process, attempts to introduce new dehydrated files in the folder are blocked. The request is processed when the hydration is complete.

20 Claims, 23 Drawing Sheets

(56) References Cited

U.S. PATENT DOCUMENTS

2018/0060350 A1\* 3/2018 Christiansen ......... G06F 3/0659
2018/0084045 A1 3/2018 Nichols et al.
2018/0121101 A1 5/2018 Thind et al.
2018/0189317 A1\* 7/2018 Kambuj ................ G06F 16/178

OTHER PUBLICATIONS

Vasudev, "SkyDrive Smart Files in Windows 8.1 & how to Hydrate them", Retrieved from: http://www.thewindowsclub.com/skydrive-smart-files-windows-8-1, Oct. 10, 2013, 8 Pages.

"International Search Report and Written Opinion Issued in PCT Application No. PCT/US2019/033867", dated Jul. 17, 2019, 14 Pages.

\* cited by examiner

HYDRATION OF A HIERARCHY OF DEHYDRATED FILES

BACKGROUND

Some file hosting and file synchronization platforms are designed to automatically synchronize files by synchronizing a cloud database with selected folders on a local drive on a client device. When a user adds new files to the selected folders at the client device, the new files are automatically uploaded to the cloud database from the client device. Some file hosting platforms allow for files to be stored at the client device solely as metadata until the user attempts to access the files. The metadata enables display of an icon for a particular file that shows the file type, file size, title, and any other suitable information for storing as metadata. When a user selects the particular file for opening, reading, or writing, the file content data for the particular file is automatically downloaded to the client device.

It is with respect to these and other considerations that the disclosure made herein is presented.

SUMMARY

In some embodiments, a particular file may be a "dehydrated" file and, therefore, the file content data is not stored on a local drive but is stored in the cloud database of a file hosting platform. As used herein, the term "dehydrated file" may refer to a data file that is stored on a local drive of a client device in a format that makes the data file visible to a user in a file-browser GUI while at least some content data of the data file is absent from the local drive. For example, a dehydrated file may be a relatively small file that is stored locally on a client device to represent a hydrated counterpart file that is stored in a cloud database. An example dehydrated file may include a thumbnail image (e.g., a reduced-size visual representation of file content data) and metadata that identifies the name of the file and points to its hydrated counterpart in the cloud. As used herein, the term "hydrated file" may refer to a data file for which both metadata and file content data are stored on a local drive of a client device so that the data file can be opened locally without fetching the file content data from a cloud database. A partially hydrated file is one where the file is between hydrated and dehydrated. In the partially hydrated state some but not all of the content is stored locally. The techniques described in this disclosure will address partially hydrated files as well as fully dehydrated files.

In some implementations, the local drive may store metadata associated with both hydrated files and dehydrated files so that the file-browser GUI can display file icons to allow the user to perform various actions with respect to the hydrated files and the dehydrated files. For example, the file-browser GUI may enable the user to open, move, delete, drag-and-drop, and/or copy-and-paste the dehydrated files within a directory (e.g., an electronic folder) at the client device. The user may also be able to perform such operations on folders as well as files. When the user attempts to open a particular dehydrated file, the system may automatically fetch the file content data corresponding to the particular dehydrated file from the cloud database. A dehydrated file may remain "dehydrated" at the client device (e.g., to save local storage space) until a user requests access to the dehydrated file (e.g., by double clicking a file icon to open the dehydrated file) at which time the dehydrated file may be automatically "hydrated" on demand by downloading its file content data. In this way, the dehydrated files don't take up substantial space on the client device because the file size of a dehydrated file may be limited to its corresponding metadata footprint.

In one embodiment, when an I/O request is associated with a dehydrated file, the I/O request may be intercepted, and the file may be hydrated before the I/O request is allowed to proceed. However, in some environments, execution of a hydration process may present challenges. Some operating system environments and file topology scenarios may make it more difficult to carry out a hydration. For example, in some environments, it is not allowed to have a dehydrated file outside of the root synchronization folder. In some cases, entire directories may be moved out of a root synchronization folder, requiring that all dehydrated files within those directories be hydrated first before the move can complete. One example of such a scenario is when a folder of photos is dragged to a user's desktop, in which case all photo files within the folder may have to be hydrated first before the move can complete.

When it is necessary to hydrate an entire directory, the capability may not be in place in some systems to effect such a transfer at all, or at least in an efficient manner. For example, this may particularly be true when an operation initiated in kernel space requires hydration, and kernel space does not have the features necessary to enumerate file hierarchies. In this case, the hydration tasks need to be handled both in kernel space and user space. For example, a kernel code extension may be loaded for an operating system, and the kernel code extension does not provide features for enumerating file hierarchies that is needed for hydration processing. If the user space has this capability, then the kernel code extension must be able to request enumeration from the user space. In various embodiments disclosed herein, functionality is described that allows for coordination of hydration functions between kernel space and user space.

In an embodiment, when an action is requested that requires a hydration of a folder that has at least one dehydrated file, then the request may be blocked until the hydration of all files completes. The kernel code may send a request to user space for a subset of the hierarchy that is affected, and to perform the hydration tasks for that subset ("subset" may also be referred to herein as "portion"). The hydration may continue with additional subsets until all files are hydrated. In one embodiment, if there are N files to hydrate, then hydration requests to user space may be queued, and requests for hydration of subsets of the N files may be sent when the previous subset is completed. A subset can be anywhere from 0 to N files. In one embodiment, the size of the subset may be determined by the user space and the size can be used only within user space. In some cases, kernel space does not have or does not need to have knowledge of the max/min of this size. Each subset may provide a snapshot of the directory or directories that are to be hydrated.

In an embodiment, if a folder is being hydrated, then any topology change under the folder will trigger a further hydration on affected files. For example, if a later change is made to a subset that has already been hydrated (before the completion of hydration of the folder), then the changed portion may be hydrated. Additionally, dehydration of that portion may not be allowed. In one embodiment, any addition or removal of a file or directory that changes the hierarchy may trigger a further hydration action. For example, adding a subdirectory with dehydrated files to a directory that is undergoing hydration may trigger a further hydration of the added subdirectory.

In an embodiment, for every folder undergoing hydration, one or more tickets may be initiated. A ticket may refer to an operation identifier that may be used to asynchronously communicate information about a particular operation request. Each time a file is created, moved, or deleted, the parent directories for the file may be traversed to determine if a parent has an active ticket. For example, the ascendant folder hierarchy (or ascendant directories) may be traversed to determine if a parent has an active ticket. As another example, when an operation is performed on a dehydrated file that may need to be hydrated, the hierarchy may be traversed upwards in the structure to determine which synchronization root that the file is in. If along the way a folder is identified that is being hydrated, then it can be determined that a hydration action may need to be initiated on the file. By handling topology changes during hydration actions, the system can deterministically complete a hydration operation for a given set of initial conditions along with subsequent changes to the hierarchy in a way that prevents a state race with the file system.

In one embodiment, the hydration may be processed, if desired, in one action rather than in subsets. Additionally, when supportable, the hydration process may be handled entirely in user space. However, it should be ensured that the kernel code is informed of the changes being made in user space and avoid access conflicts between the kernel and user space for files that are being hydrated.

Functionality may also be implemented that allows for cancellation of a pending folder hydration process, and reporting of progress of the hydration action. For example, when a ticket is launched, a time-to-live (TTL) may be associated with the ticket that can be updated to indicate that the hydration request is being processed.

In various embodiments described herein, a communication mechanism between kernel space and user space is disclosed that allows for the directory hierarchy to be communicated. Additionally, in some embodiments, a way to identify and handle changes in topology during a hydration process is disclosed. By identifying and processing changes as disclosed, race conditions can be avoided which can result by only monitoring for changes.

The embodiments disclosed herein can thus increase the reliability and performance of operating systems and their extensions by enabling efficient and reliable hydration of directories. More reliable and efficient hydration processes for hierarchical structures may, in turn, result in better performing computing devices that utilize fewer processor cycles, less memory, and less power. Other technical benefits not specifically mentioned herein can also be realized through implementations of the disclosed subject matter.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

DETAILED DESCRIPTION

Figure 1:
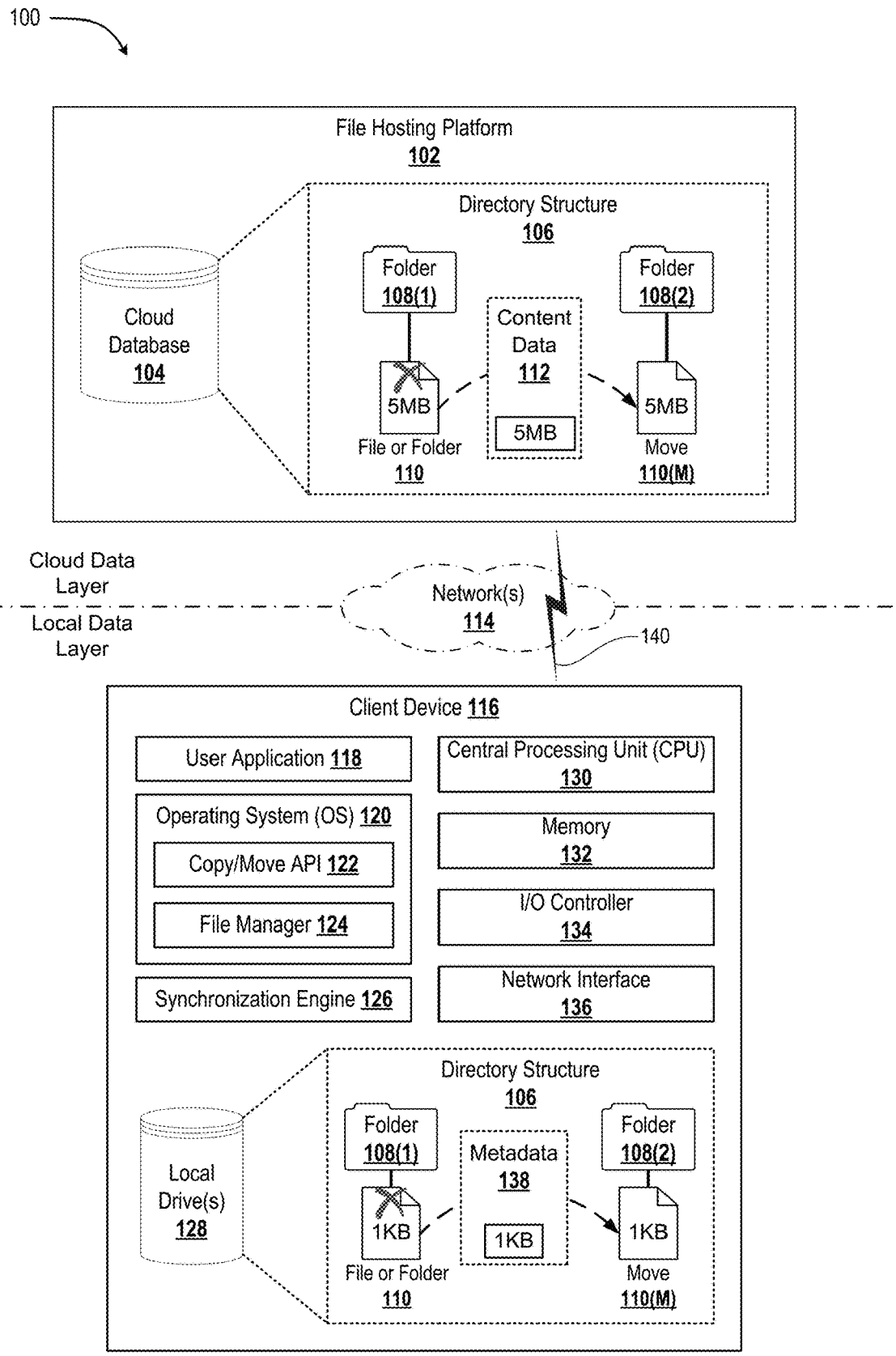
FIG. 1 illustrates an example computing architecture including a file hosting platform.

The following Detailed Description describes technologies that enable a system to hydrate file hierarchies in response to system actions that require hydration of an entire folder. On some systems that employ hydrated and dehydrated files, a file hosting platform may generate "hydrated" copies of files in a cloud database. For example, an individual file is a dehydrated file for which the file content data is not stored locally at the client device but is rather stored in the cloud database.

As described above, the term "dehydrated file" may refer to a data file that is stored on a local drive of a client device in a format that makes the data file visible to a user in a file-browser GUI while at least some content data of the data file is absent from the local drive. For example, a dehydrated file may be a relatively small file that is stored locally on a client device to represent a hydrated counterpart file that is stored in a cloud database. An example dehydrated file may include a thumbnail image (e.g., a reduced-size visual representation of file content data) and metadata that identifies the name of the file and points to its hydrated counterpart in the cloud. More generally, we can define a dehydrated file as any file that has metadata but does not have the entire content on disk. Accordingly, hydration is the act of retrieving any content not already on disk by downloading it from the cloud.

As described above, the term "hydrated file" may refer to a data file for which both metadata and file content data are stored on a local drive of a client device so that the data file can be opened locally without fetching the file content data from a cloud database. A partially hydrated state is one where the file is mixed between hydrated and dehydrated. In the partially hydrated state some but not all of the content is on disk. The mechanisms described in this disclosure will address partially hydrated files as well as fully dehydrated files.

In a more general embodiment, a dehydrated file may be defined as any file that has metadata but does not have the entire content on disk. Hydration, then, is the act of retrieving any content not already on disk by downloading it from the cloud.

The disclosed technologies represent a substantial advantage over existing file hosting platforms where support for hydrating a directory structure (e.g., an electronic folder structure and/or any other scheme suitable for navigably arranging pluralities of data files) are lacking or inefficient, and/or are not adequately supported in kernel space. These shortcomings of existing file hosting platforms and associated client devices running file I/O managers exacerbate computing resource scarcity issues including the overuse of processing resources as well as the finite nature of local storage space on client devices. It can be appreciated, therefore, that the disclosed technologies represent a substantial advance toward reducing processor and storage usage associated with implementing file hosting platforms and managing cloud databases.

Referring to FIG. 1, illustrated is an example system 100 including a client device 116 and a file hosting platform 102 configured to maintain copies of files in a cloud database 104. The client device 116 may have a file I/O manager. For example, when performing an operation on a moved file or folder 110(M) of an individual file or folder 110 at a local drive 128 (e.g., a SATA-type solid-state hard drive and/or any other suitable drive-type) of the client device 116, the system 100 may cause the file hosting platform 102 to locate content data 112 for the file or folder 110 within the cloud database 104, depending on where the folders are located, relative to the sync root. Accordingly, as illustrated, an instance of the moved file or folder 110(M) that is stored at the cloud database 104 can be "hydrated" with the content data 112. In one example, the source (origin) file of the move may be hydrated first before the move takes place, and the destination file of the move may as a result be hydrated. Example file hosting platforms 102 include, but are not limited to, DROPBOX, BOX, GOOGLE DRIVE, MEGA, PCLOUD, SUGARSYNC, AMAZON DRIVE, and/or MICROSOFT ONEDRIVE.

In some embodiments, the file hosting platform 102 may include a directory structure 106 for storing data associated with one or more files or folders 110 within the cloud database 104. As used herein, the term "directory structure" may refer generally to any scheme with which a file system may cause files to be displayed to a user. An example directory structure includes, but is not limited to, an electronic folder structure. In the specific embodiment of FIG. 1, the directory structure 106 may include one or more folders 108 at which one or more files or folders 110 are stored. As used herein, the term "folder" may refer to a directory defined in a hierarchical file system cataloging structure and may include references to individual ones of the one or more files 110 and/or other folders 110. For example, as illustrated, the directory structure includes a first folder 108(1) that includes a reference to a file or folder 110 and a second folder 108(2) to which the file or folder 110 may be moved to generate a moved file or folder 110(M). As further illustrated, the local counterpart to the file or folder 110 is dehydrated within the first folder 108(1) within the directory structure 106 at the local drive 128.

As used herein, the term "hydrated" may be used as a descriptive term to indicate that an instance of a file or folder 110 at a particular storage location (e.g., the cloud database 104, the local drive 128, etc.) has its corresponding content data 112 also stored at the particular storage location. For example, in the illustrated example, the instance of the file or folder 110 that is stored in the cloud database 104 can be described as a hydrated file or folder since its 5 MB of corresponding content data 112 is also stored within the cloud database 104.

As used herein, the term "dehydrated" may be used as a descriptive term to indicate that an instance of the file 110 at a particular storage location does not have its corresponding file content data 112 also stored at the particular location. For example, in the illustrated example, the instance of the file or folder 110 that is stored in the local drive 128 can be described as a dehydrated file or folder since its 5 MB of corresponding content data 112 is absent from the local drive 128.

A partially hydrated file may be one where the file is between hydrated and dehydrated. In the partially hydrated state some but not all of the content is stored locally. The techniques described in this disclosure will address partially hydrated files as well as fully hydrated and fully dehydrated files.

An example dehydrated file may be a file or folder that is stored on the local drive 128 solely as metadata 138 so that the client device 116 can display a file-browser GUI that enables the user to perform certain actions at the client device 116 which do not require accessing content data such as, for example, viewing properties of the dehydrated file or folder, moving the dehydrated file or folder within the directory structure 106, deleting the dehydrated file or folder from the directory structure 106 which may or may not trigger hydration depending on the type of delete, or any other operations that may be performed without accessing content data 112. When the user attempts to open a particular dehydrated file, the system 100 may automatically fetch corresponding content data 112 from the cloud database 104. Stated alternatively, a dehydrated file or folder may remain "dehydrated" at the client device 116 (e.g., to save local storage space) until a user requests access to the dehydrated file or folder (e.g., by double clicking a file icon to open the dehydrated file) at which time, in some embodiments, the dehydrated file may be automatically "hydrated" on demand by downloading its content data 112. In this way, the dehydrated files do not take up substantial space on the client device 116 because the size of a dehydrated file may be limited to its corresponding metadata footprint.

In some examples, a file or folder can be partially dehydrated at a particular storage location. For example, a file or folder may be stored at the local drive 128 as the metadata 138 and some but not all of its corresponding content data. As a more specific example, a 5 MB file may be stored locally as metadata 138 (e.g., to make file properties viewable) and a most commonly accessed 2 MB portion of the 5 MB. For purposes of the present discussion, describing an instance of a file or folder at any particular storage location as "hydrated" is not to be construed as an indication that another instance of that file or folder (or other files or folders for that matter) is, or even could be, "dehydrated" at that particular storage location. For example, in some implementations, the file hosting platform 102 is configured to store all file or folder instances along with their corresponding content data 112 such that all file or folder instances stored within the cloud database 104 may be referred to as "hydrated." Stated alternatively, in some implementations, none of the file or folder instances stored within the cloud database 104 are "dehydrated."

In some embodiments, the client device 116 may include a user application 118 that provides access to the one or more files 110 in accordance with the directory structure 106. For example, the user application 118 may cause the client device 116 to display a file-browser graphical user interface (GUI) that enables a user to navigate through the directory structure 106. As a more specific but nonlimiting example, the user application 118 may cause the client device to display graphical folder representations for individual ones of the folders 108 and may further display file icons within the graphical folder representations to enable the user to view the status of a file, and in some embodiments, to open, move, delete, or copy files contained within the folders 108.

In some embodiments, the user application 118 may communicate with one or more components of an operating system (OS) 120 for the purpose of displaying the file-browser GUI and/or for facilitating the generation of selection data that indicates a file or folder 110 and a destination path within the directory structure 106 to copy or move the file or folder 110 to. The OS 120 may be any suitable system software for managing computer hardware and/or software resources and for providing services to the user application 118 and/or other applications (not shown). An example OS 120 may include, but is not limited to, various versions of MICROSOFT WINDOWS (e.g., WINDOWS 8.1 or 10, WINDOWS EMBEDDED STANDARD 7, etc.) and/or various versions of macOS (e.g., macOS HIGH SIERRA etc.).

In some examples, the user application 118 may communicate with a file manager 124 of the OS 120. Example file managers include, but are not limited to, the FILE EXPLORER component of MICROSOFT WINDOWS and/or the FINDER component of the family of MACINTOSH operating systems developed by APPLE, INC. In some examples, the user application 118 may communicate with a copy/move application programming interface (API) 122 of the OS 120. The copy API 122 may be an abstraction of a data reading functionality that causes the client device 116 to read data from a specified file or folder and a data writing functionality that causes the client device 116 to write data to a specified destination path. In some embodiments, a move may be implemented as a reparent. Example user applications 118 include, but are not limited to, desktop client applications that are specifically configured to communicate with the file hosting platform 102 (e.g., the DROPBOX APP desktop application developed by DROPBOX, the BOX DRIVE desktop application developed by BOX, and/or, the ONEDRIVE desktop client). Accordingly, it can be appreciated that in various implementations the user application 118 may be configured to maintain a local instance of the directory structure 106 and to enable the user to browse through the local instance of the directory structure 106 without continuously communicating with the file hosting platform 102.

In some implementations, the client device 116 may include a synchronization engine 126 for synchronizing the local instance of the directory structure 106 that resides at the client device 116 with a cloud instance of the directory structure 106 that resides on the cloud database 104. Example synchronization engines 126 include, but are not limited to, SYNCHRONIZATION API developed by DROPBOX, BACKUP AND SYNCHRONIZATION developed by GOOGLE, and the ONEDRIVE sync engine. Accordingly, it can be appreciated that the synchronization engine 126 may be a native component of the OS 120 or may be an add-on component that is downloaded and installed onto the client device 116 separate from the OS 120.

In various implementations, the synchronization engine 126 is configured to provide access to at least some files or folders 110 stored in the cloud database 104 without downloading the content data 112 corresponding to these files or folders to the local drive 128. For example, the synchronization engine 126 may maintain a local directory structure (e.g., an instance of the directory structure 106 that resides on the client device 116) that includes a set of dehydrated files or folders associated with first content data that is absent from the local drive 128. In such an example, a cloud directory structure (e.g., an instance of the directory structure 106 that resides on the file hosting platform 102) may include hydrated counterparts for individual dehydrated files of the set of dehydrated files. Accordingly, a user may be able to see icons and/or other data associated with dehydrated files or folders in the file-browser GUI just like any other file or folder stored on the client device 116. In some implementations, when a user instructs the OS 120 to open a particular dehydrated file, the synchronization engine 126 automatically downloads the content data 120 that corresponds to the particular dehydrated file or folder. For example, upon a user instructing the OS 120 to open the "dehydrated" instance of the file 110 stored on the local drive 128, the synchronization engine 126 may automatically begin communicating with the file hosting platform 102 to download the 5 MB of content data 112 that corresponds to the file 110.

As further illustrated, the client device 116 includes a central processing unit ("CPU") 130 that is connected, via a bus (not shown), to various components such as the local drive 128, a memory 132, an input/output (I/O) controller 134, and/or a network interface 136. It can be appreciated that the system components described herein (e.g., the user application 118, the OS 120, and/or the synchronization engine 126) may, when loaded into the CPU 130 and executed, transform the CPU 130 and the overall client device 116 from a general-purpose computing system into a special-purpose computing system customized to facilitate the functionality presented herein. The CPU 130 may be constructed from any number of transistors or other discrete circuit elements, which may individually or collectively assume any number of states. More specifically, the CPU 130 may operate as a finite-state machine, in response to executable instructions contained within the software modules disclosed herein. These computer-executable instructions may transform the CPU 130 by specifying how the CPU 130 transitions between states, thereby transforming the transistors or other discrete hardware elements constituting the CPU 130.

The local drive 128 and associated computer-readable media provide non-volatile storage for the client device 116. Although the description of computer-readable media contained herein refers to a mass storage device, such as a solid-state drive and/or a hard disk, it should be appreciated by those skilled in the art that computer-readable media can be any available computer storage media or communication media that can be accessed by a computing architecture such as, for example, the system 100. Communication media includes computer-readable instructions, data structures, program modules, and/or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above are also included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the client device 116. For purposes of the claims, the phrase "computer storage medium," "computer-readable storage medium," and variations thereof, does not include waves, signals, and/or other transitory and/or intangible communication media, per se.

The I/O controller 134 may receive and process input from a number of other devices, including a keyboard, mouse, or electronic stylus (not shown in FIG. 1). Similarly, the I/O controller 134 may provide output to a display screen (e.g., to display the file-browser GUI described herein), a printer, or other type of output device (also not shown in FIG. 1). The network interface 136 may enable the client device 116 to connect to one or more network(s) 114 such as a local area network (LAN), a wide area network (WAN), a wireless local area network (WLAN), or any other suitable network for passing information between the client device 116 and the file hosting platform 102.

With respect to the process flow scenario of FIG. 1, in the illustrated example the process is initiated by a user of the client device 116 performing a local file or folder move operation on the client device 116 for moving the dehydrated instance of the file or folder 110. For illustrative purposes, the dehydrated instances of the file or folder 110 and the moved file or folder 110(M)) are marked in FIG. 1 as "1 KB" to indicate that these instances are stored on the local drive 128 as metadata only (e.g., without the content data 112). In the local move operation, the user has selected the file or folder 110 from the first folder 108(1) and has indicated the second folder 108(2) as being a destination path to move file or folder 110 to. Accordingly, as illustrated, the client device 116 reads the metadata 138 for the file or folder 110 from within the first folder 108(1) and writes the metadata 138 to the second folder 108(2) to generate a moved file or folder 110(M) at the client device 116.

Based on the user having initiated the local move operation, the client device 116 may communicate with the file hosting platform 102 via a communication link 140 that is facilitated by the network(s) 114 to remotely initiate a cloud file or folder move operation that corresponds to the local file or folder move operation. For example, the client device 116 may indicate a source ID blob corresponding to the file or folder 110 to enable the file hosting platform 102 to identify a hydrated counterpart of the file or folder 110 and, ultimately, to read content data 112 of the hydrated counterpart to generate a hydrated instance of the moved file or folder 110(M) within the cloud data layer.

For illustrative purposes, the hydrated instances of the file or folder 110 and the moved file or folder 110(M)) are marked in FIG. 1 as "5 MB" to indicate that these instances are stored in the cloud database 104 with at least the content data 112 (and in some implementations the metadata 138 as well). Accordingly, it can be appreciated that the system 100 enables the user to move or generate copies of file or folder at the client device 116 and, based thereon, causes the file hosting platform 102 to generate backups of these copies in the cloud database 104 without transferring the content data 112 from the local data layer over the networks into the cloud data layer or without transferring the content data 112 from the cloud data layer to the local data layer. The client device 116 is configured to remotely initiate cloud file or folder move operations that are contained within the cloud data layer (e.g., in the sense that content data is not transferred between the local data layer and the cloud data layer) based on the user initiating local copy operations that occur at the client device 116. Local copy operations may cause hydration.

Figure 2:
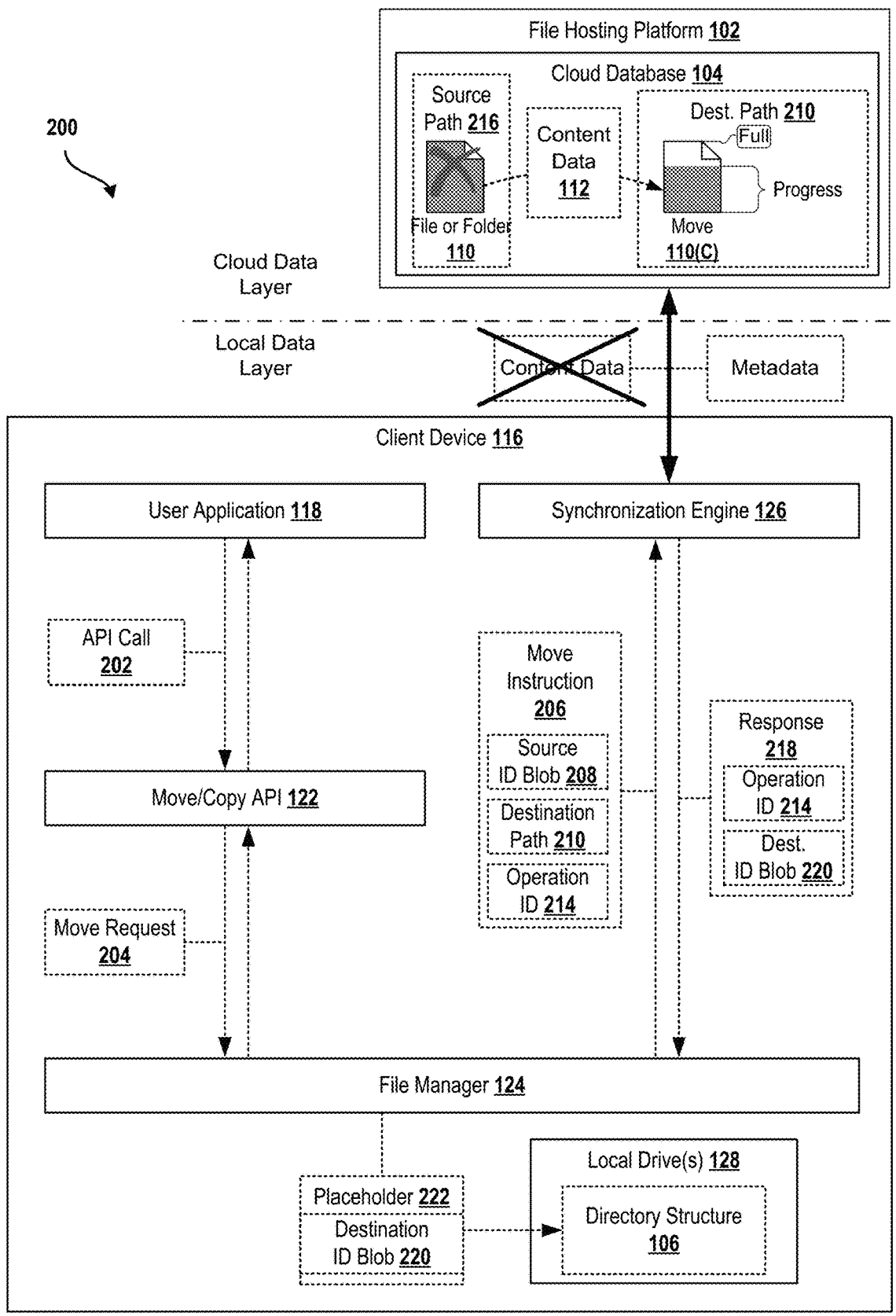
FIG. 2 illustrates an example dataflow scenario in which a file hosting platform is caused to hydrate a file or a folder as a result of a move.

Referring to FIG. 2, an example dataflow scenario 200 is illustrated in which the file hosting platform 102 is caused to move an instance of a moved file or folder 110(M) in the cloud database 104 without a corresponding instance of the moved file or folder 110(M) at the client device 116 being hydrated with content data 112. As illustrated, the user application 118 generates an API call 202 to deploy functionality of the copy/move API 122. In some examples, the user application 118 that generates the API call 202 may be a desktop client application that is configured to communicate with the file hosting platform 102 to enable the user to access and/or manage (at the client device 116) files or folders that are stored in the cloud database 104. For example, the user application 118 may locally populate one or more folders with local instances of the files or folders that are stored in the cloud database. In some examples, the user application 118 may further be configured to automatically backup file or folder that a user places into the directory structure 106 at the client device 116. For example, the user application 118 may automatically upload new content that is added to one or more folders on the local drive 128.

In an example embodiment, the API call 202 may be generated by the user application 118 in response to selection data that is generated based on a user interaction with a file-browser GUI. Example user interactions include, but are not limited to, a user dragging the file or folder 110 from the first folder 108(1) to the second folder 108(2) in a manner that instructs the user application 118 to move the moved file or folder 110(M) to the second folder 108(2), or any other user interaction suitable to instruct the user application 118 to move the file or folder 100 to a specified location.

In response to the API call 202, the copy/move API 122 may communicate a move request 204 to the file manager 124. In some examples, the file manager 124 may include a native filter manager for managing and/or implementing various filter drivers such as, for example, a cloud filter driver that is configured to communicate with the synchronization engine 126. In the illustrated data flow scenario 200, the file manager 124 both updates the local drive 128 based on the move request 204 and also communicates with the synchronization engine 126 to cause the file hosting platform 102 to make corresponding updates to the cloud database 104. More specifically, the file manager 124 transmits a move instruction 206 to the synchronization engine 126 wherein the move instruction 206 includes various parameters associated with the move request 204.

In the illustrated example, the move instruction 206 includes a source ID blob 208 that is usable by the file hosting platform 102 to locate a source file or folder that includes the content data 112 for the file or folder 110 that the user has selected for moving. For example, the source file ID blob 208 may enable the file hosting platform 102 to identify a source path 216 of the hydrated instance of the file or folder 110 at the cloud database 104. In various implementations, the source ID blob 208 may have been previously provided to the client device 116 by the file hosting platform 102 when the hydrated instance of the file or folder 110 was created within the cloud database 104. As further illustrated, the move instruction 206 includes a destination path 210 to identify a particular location to which the file or folder 110 is to be moved. For example, the destination path 210 may indicate that the file or folder 110 is to be moved to the second folder 108(2) within the directory structure 106.

Upon receiving the move instruction 206, the synchronization engine 126 may communicate at least some aspects of the move instruction 206 to the file hosting platform 102 to trigger a move operation that occurs within the cloud data layer. For example, as illustrated, the synchronization engine 126 and the file hosting platform 102 may communicate metadata associated with the file or folder 110 (e.g., the source file ID blob 208) and/or the moved file or folder 110(M) (e.g., the destination path 210 and/or a destination ID blob 220). The communications received from the synchronization engine 126 may trigger the file hosting platform 102 to initiate a file or folder move operation that is contained within the cloud data layer. For example, as illustrated, the communication triggers the file hosting platform 102 to read the content data 112 from the source path 216 and also to write the content data 112 to the destination path 210 to generate the moved file or folder 110(M) in the cloud database 104.

In some implementations, the synchronization engine 126 may communicate a response 218 back to the file manager 124 to inform the file manager 124 whether a file or folder move operation has been successfully initiated at the file hosting platform 102 and/or whether the file hosting platform 102 has been able to locate a source file or folder (e.g., a file or folder that includes the content data 112) using the source ID blob 208. In various examples, the response 218 may include a destination ID blob 220 that is usable by the file hosting platform 102 to locate the newly generated hydrated instance of the moved file or folder 110(M). In some implementations, the destination ID blob 220 may be provided to the synchronization engine 126 by the file hosting platform 102 as a unique identifier for the hydrated instance of the moved file or folder 110(M) that is being generated in the cloud database 104. Thus, the destination file ID blob 220 can be subsequently provided back to the file hosting platform 102 in a request for content data and, by virtue of the destination ID blob 220 being included within the request, the file hosting platform 102 will know which content is being requested.

As further illustrated, the file manager 124 may store in the local drive 128 the destination ID blob 220 along with a placeholder 222 associated with the moved file or folder 110(M). As described above, the placeholder 222 may enable the system 100 to provide access to the moved file or folder 110(M) at the client device 116 once the file or folder move operation has been completed at the file hosting platform 102. For example, the placeholder 222 may cause the client device 116 to display a graphical icon representation of the moved file or folder 110(M) within a file-browser GUI even though the content data 112 is absent from the local drive 128. Then, if the user goes to open the moved file or folder 110(M) (e.g., by performing a double click on the graphical icon), the client device 116 may automatically download the content data 112 from the file hosting platform 102 by sending a request for content data to the file hosting platform 102 and including the destination file ID blob 220 with the request.

In some implementations, the move instruction 206 may include an operation identifier (ID) 214 (which is herein referred to as a ticket) to enable the synchronization engine 126 and the file manager 124 to asynchronously communicate about a particular move request 204, and an associated hydration request if one is needed. ID 214 may be used for the hydration process if needed. For example, the file manager 124 may provide the operation ID 214 to the synchronization engine 126 which may then return the operation ID 214 within the response 218 to indicate that the response 218 corresponds to the move instruction 206 and not some other move instruction (not shown). It can be appreciated, therefore, that by including the operation ID 214 within the response along with the destination file ID blob 220, the file manager 124 is able to attach the destination file ID blob 220 onto the correct placeholder 222.

Figure 3A:
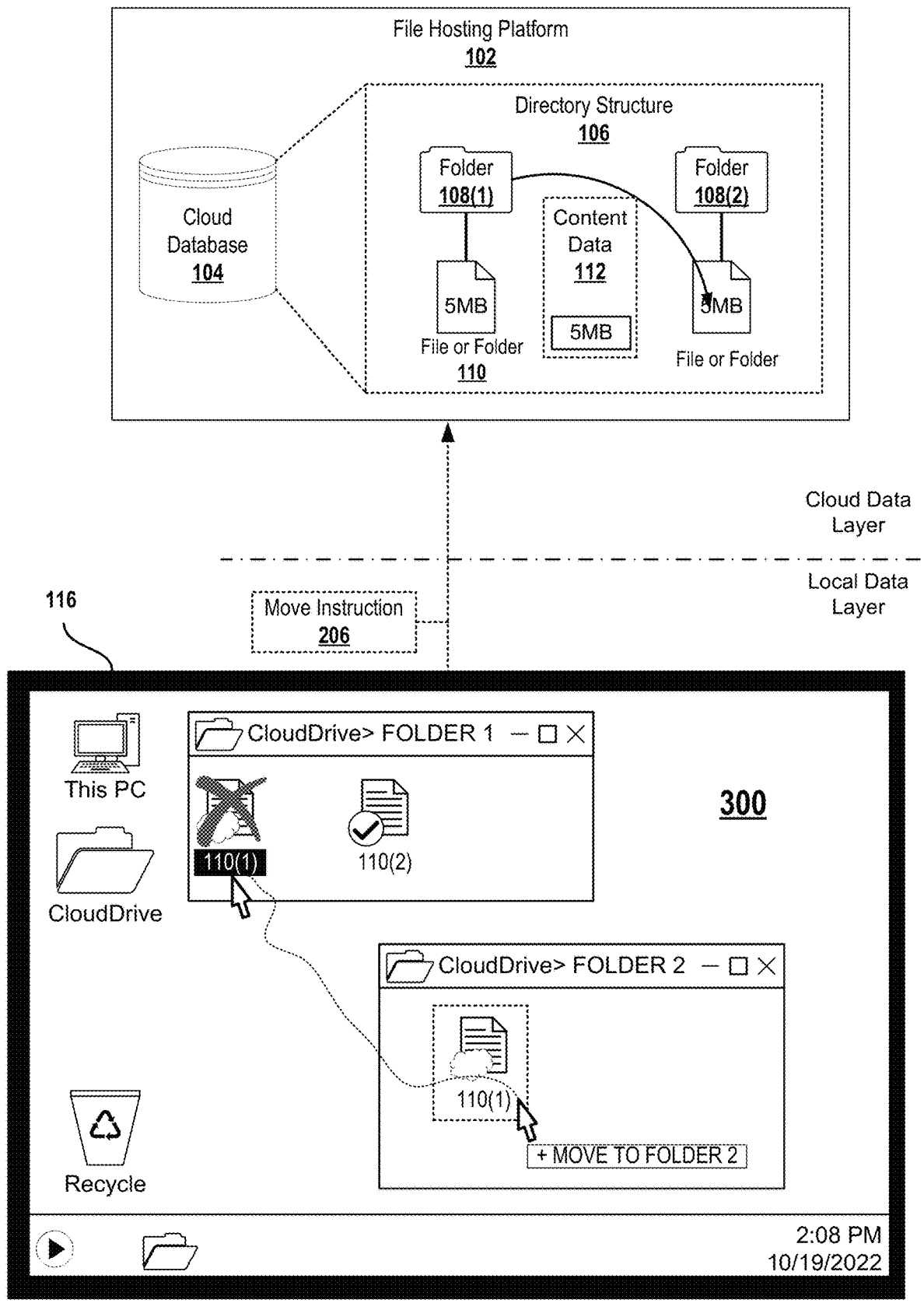
FIG. 3A illustrates an example user interface and flow diagram that shows a local move operation.

Referring to FIG. 3A, an example file-browser GUI 300 is illustrated that can be displayed at the client device 116 in association with the user application 118 to enable a user to enter commands for file or folder operations within the directory structure 106. In the illustrated example, a user is performing a drag-and-drop gesture to move a first file or folder 110(1) from a first folder 108(1) to a second folder 108(2). Based on the drag-and-drop gesture, the user application 118 generates selection data that indicates the first file or folder 110(1) as well as a destination path within the directory structure 106 to move the first file or folder 110(1) to. As further illustrated, the client device 116 may generate the move instruction 206 based on the selection data and, ultimately, may transmit at least some aspects of the move instruction 206 to the file hosting platform 102 in accordance with the techniques described herein.

In some embodiments, the file-browser GUI 300 may be configured to graphically indicate a hydration status for file or folder 110. In the illustrated example, the file-browser GUI 300 is graphically representing two files or folders within the first folder 108(1) along with an indication of a hydration status for each of these two files or folders. More specifically, the first file or folder 110(1) is represented with a cloud icon superimposed over its corresponding file icon to indicate that this file or folder is dehydrated at the client device 116. Thus, a user can tell from the cloud icon that the content data 112 for the first file or folder 110(1) is absent from the local drive 128 of the client device 116. Moreover, a second file or folder 110(2) is represented with a checkmark icon indicating that this file or folder is hydrated at the client device 116. Thus, a user can tell from the checkmark icon that the content data 112 corresponding to this file or folder is currently stored on the client device 116 such that this file or folder can be opened locally without having to fetch the content data from the file hosting platform 102. In various implementations, a user may be able to designate which files or folders to hydrate locally and/or which files or folders to store locally in a dehydrated state.

Figure 3B:
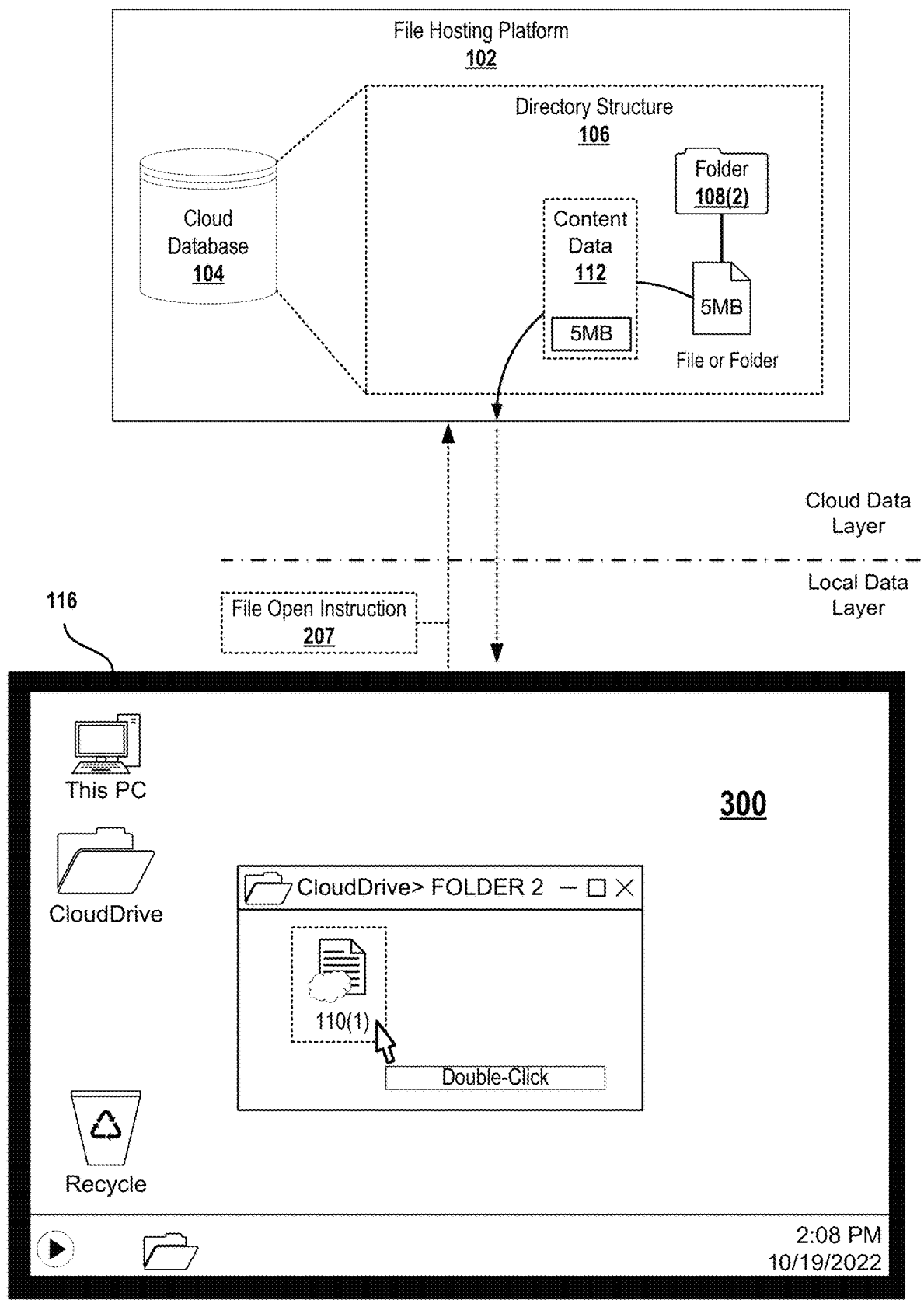
FIG. 3B illustrates an example user interface and flow diagram that shows a local file open action on a dehydrated file.

Referring to FIG. 3B, the user is performing a double-click on the icon representing file or folder 110(1) to open file or other folder 110(1). Based on the open command, the user application 118 generates selection data that indicates the first file or folder 110(1) should be opened. As further illustrated, the client device 116 may generate the open instruction 207 based on the selection data and, ultimately, may transmit at least some aspects of the open instruction 207 to the file hosting platform 102 in accordance with the techniques described herein.

In the illustrated example, the file-browser GUI 300 is graphically representing file or folder 110(1) along with an indication of the dehydrated status. More specifically, the first file or folder 110(1) is represented with a cloud icon superimposed over its corresponding icon to indicate that this file or folder is dehydrated at the client device 116. Thus, a user can tell from the cloud icon that the content data 112 for the first file or folder 110(1) is absent from the local drive 128 of the client device 116.

Figure 3C:
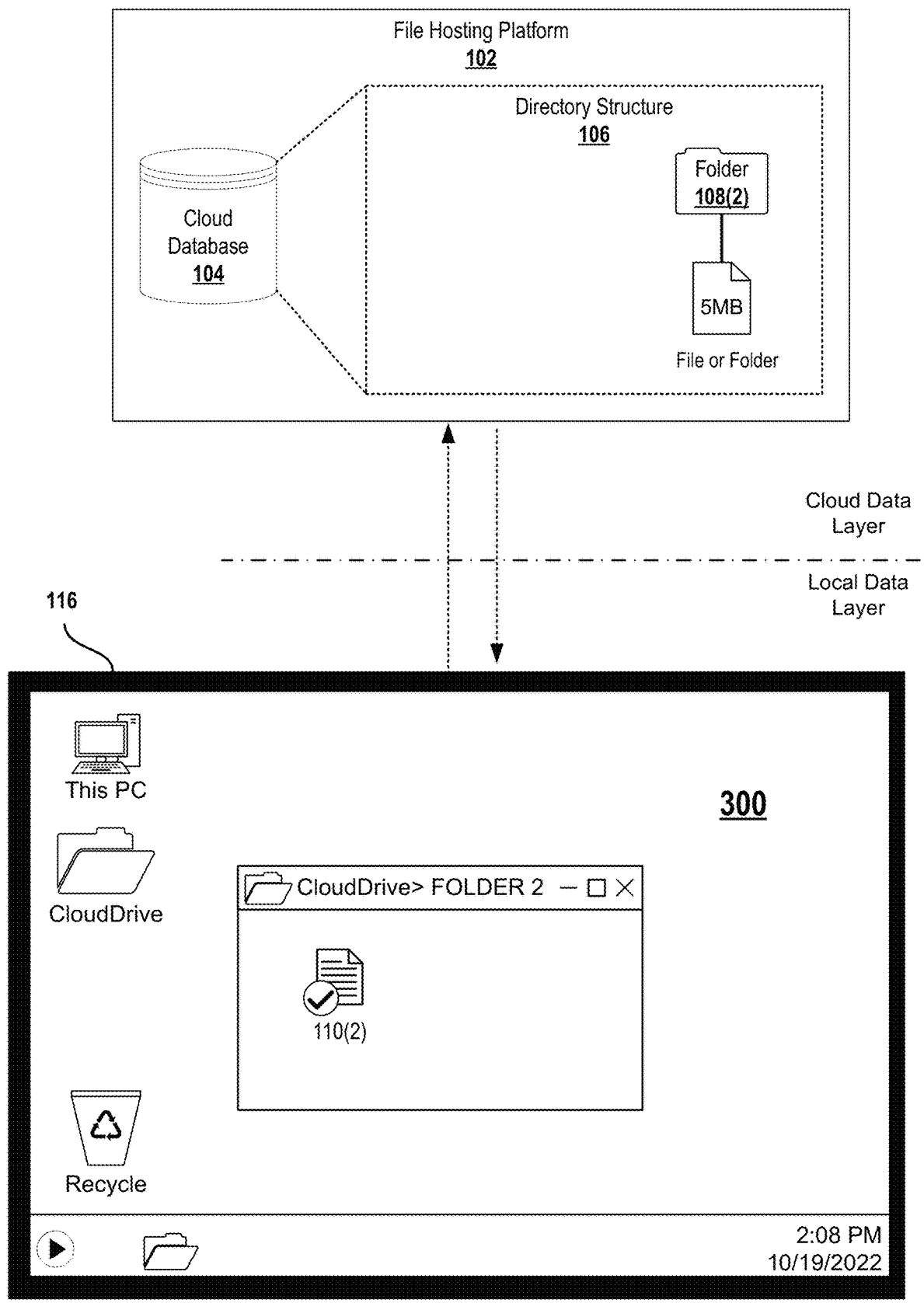
FIG. 3C illustrates an example user interface and flow diagram of a hydrated file.

Referring to FIG. 3C, the file-browser GUI 300 is graphically representing file or folder 110(2) along with an indication of the hydrated status after the content data 112 has been sent to the client device 116. Furthermore, file or folder 110(2) is represented with a checkmark icon indicating that this file or folder is hydrated at the client device 116.

It should be noted that while the examples illustrate operations on files and hydration of dehydrated files, the techniques discussed herein may be applied to folders and multiple hierarchies of folders. The techniques discussed herein may also be applied to dehydration of hydrated files and folders, or a combination.

Disclosed herein is a mechanism to hydrate a folder that has one or more dehydrated descendant files. Therefore in terms of what is illustrated in FIGS. 1-3, the present disclosure extends what is implemented for files to folders. File copies are typically implemented by the OS as a read on the source file and a write to the target. Folder copies are implemented by the OS in a similar manner as file copy. The difference is that for a folder copy, the OS traverses the folder hierarchy, finds subfolders and files, and creates them in the target. Each individual file is read from source and written to target, which appears to the placeholder system like any other application trying to read a file.

Moves of individual files may be implemented as a reparent of the file to a new parent. There's no read, so the placeholder system may not detect that a move occurred on the file and trigger a hydration. However, since the move operation just involves one file, the move can be blocked until the file hydration completes. Folder moves are also implemented as a reparent of the folder to a new parent. However, there is no operation that occurs on any of the descendent subfolders or files of that folder that could be used to trigger hydration of those files. This means that if a folder is moved outside of a synchronization root, there may not be any events on the files within that folder, so with the result could be that dehydrated files will be outside the synchronization root. The present disclosure describes ways to address this scenario. Specifically, some or all the following operations may be included in some embodiments:

Determine that a folder move has occurred.
Temporarily block the folder move.
Enumerate all of the files within the folder. This may be performed in whole or in part in user space, as further described herein.
Generate a hydration request for each file within the folder. This hydration request may appear to the synchronization engine like any other hydration request.
Wait for all hydration requests to complete.
Repeat the previous three steps until all files are enumerated and hydrated.
Unblock the folder move.

Additionally, the act of the folder being moved may be detected so that any other independent file or folder operations (e.g., topological operations) may trigger hydration.

In some embodiments, at least a portion of the described techniques may be implemented in kernel space, and user space support may be provided for tasks such as directory enumeration and file download. In some embodiments, the disclosed techniques may enumerate the folder hierarchy in user space. The techniques may include a communication protocol between kernel space and user space to perform hydration of a folder. In some embodiments, the techniques may provide folder enumeration, file hydration request queuing, and waiting for file hydration completions. The techniques may include functionality to handle topological changes that can modify the folder hierarchy while the hydration is ongoing. The techniques may also be thread-safe in that multiple threads can be executing the same algorithm at once.

As discussed above, in some systems support for file hydration may be available, but support for handling hydration of a folder may be lacking and/or cumbersome and inefficient. "Folder hydration" may refer to the hydration of all descendant files of a folder. In the case of kernel code extensions, folder hydration capability may be needed in some cases, such as when most of the file system operations that occur at folder-level do not trigger moves for each of the descendant files. Instead, the kernel code may be asked to authorize or deny the folder operation.

For example, consider the move of a folder from within the synchronization root to outside the synchronization root. In some embodiments, an authorization to delete the source folder and an authorization to add to the target folder may be issued. However, this operation may not be allowed unless and until all dehydrated descendant files of the folder being moved are hydrated successfully. If the descendant files of the folder being moved are not hydrated and the operation is authorized, the folder will be moved along with dehydrated files outside of the synchronization root, which is not typically allowed because in some embodiments, dehydrated files living outside the synchronization root are unusable because their contents cannot be retrieved. In order to authorize such operations, folder hydration must be provided. In one embodiment, the authorization request may be blocked (i.e., block the folder operation from proceeding) until all dehydrated descendant files of the folder have been hydrated.

Various embodiments are described for implementing a folder hydration once a folder hydration is determined to be needed. In one embodiment, the following process may be implemented:
1) Block the folder operation that requires folder hydration
2) Enumerate all descendant files of the folder
3) Hydrate all dehydrated files
4) Once all hydrations are completed: unblock the folder operation by authorizing it if all file hydrations succeeded and deny the folder operation otherwise In an embodiment, enumeration of all descendant files of the folder and hydration of all dehydrated files may be handled in user space if the applicable functionality is provided in user space. For example, reads and writes to placeholders in user space may be needed. However, in many environments, these and other operations may not be available or may be curtailed to the extent that file hydration operations solely in user space are not available.

In some embodiments, folder hydration operations may be implemented primarily in kernel space, with the exception of folder enumeration which may not be available or possible in kernel space. The actual hydration of a file may be performed by the synchronization engine.

In one embodiment, folder enumeration may be performed in subsets or portions. In this embodiment, the user space may return a fixed number of descendant files to kernel space as part of the enumeration request. The kernel space may continue to send requests to the user space for more descendant files until the user space responds with an empty list, indicating that there are no more descendant files.

Figure 4:
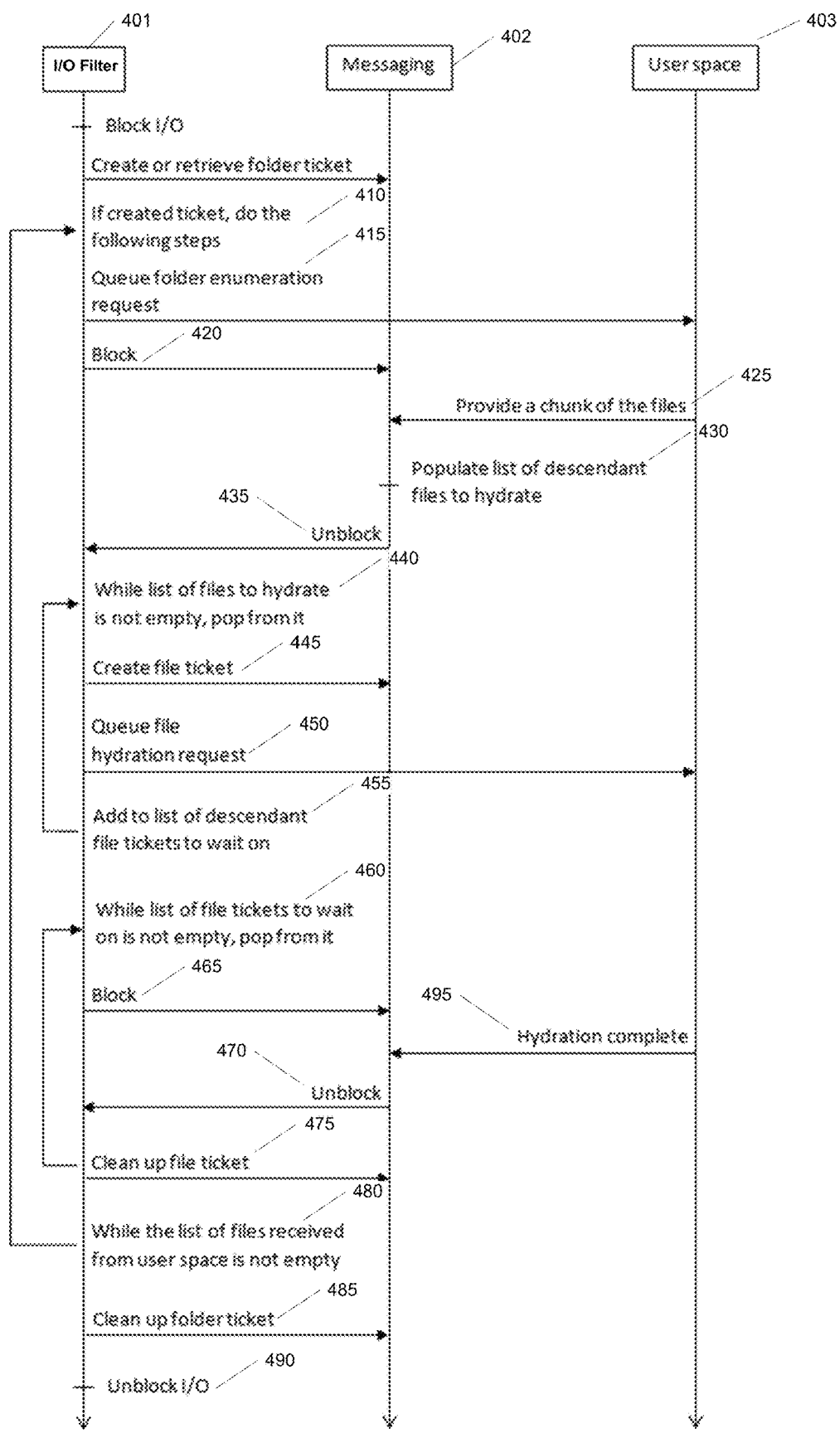
FIG. 4 is a flow diagram of an example method for implementing an embodiment disclosed herein.

An example of a folder hydration algorithm is provided below and with reference to FIG. 4 which illustrates an I/O filter 401, messaging function 402, and user space 403, in one example embodiment.

> Folder needs to be hydrated
> Create or retrieve (if one already exists) a folder hydration ticket (kernel ticket K1) (410).
> If a ticket was created, perform the following steps while the list of files received from user space is not empty:
> > create a request to enumerate the folder and send to user space (415).
> > Wait on the response from user space to the enumeration request.
> > Once the response is received, we have the initial list of files to hydrate.
> Store information about each file on a list of descendant files maintained on the folder ticket (430).
> > For each file in the list of descendant files (if any)
> > > If it is not a dehydrated placeholder, skip it and continue the loop.
> > > Send a hydration request to the user space (kernel ticket Ki for the i-th file) (450).
> > > Store the file hydration ticket on a list of descendant file tickets maintained on the folder ticket (455).
> > > If we failed to queue the hydration request, overwrite the folder hydration status with the failure code [Here, hydration status indicates the success/failure status of the hydration operation.]
> > > For each ticket Ki in the list of descendant file tickets (if any)
> > > > Wait on kernel ticket Ki to be completed.
> > > > If the hydration was a failure, overwrite the folder hydration status with the failure code.
> > > > Clean up ticket Ki (475).
> clean up kernel ticket K1 (485) and exit the function (which will unblock the operation on the folder (490)) with the appropriate hydration status.

Figure 5:
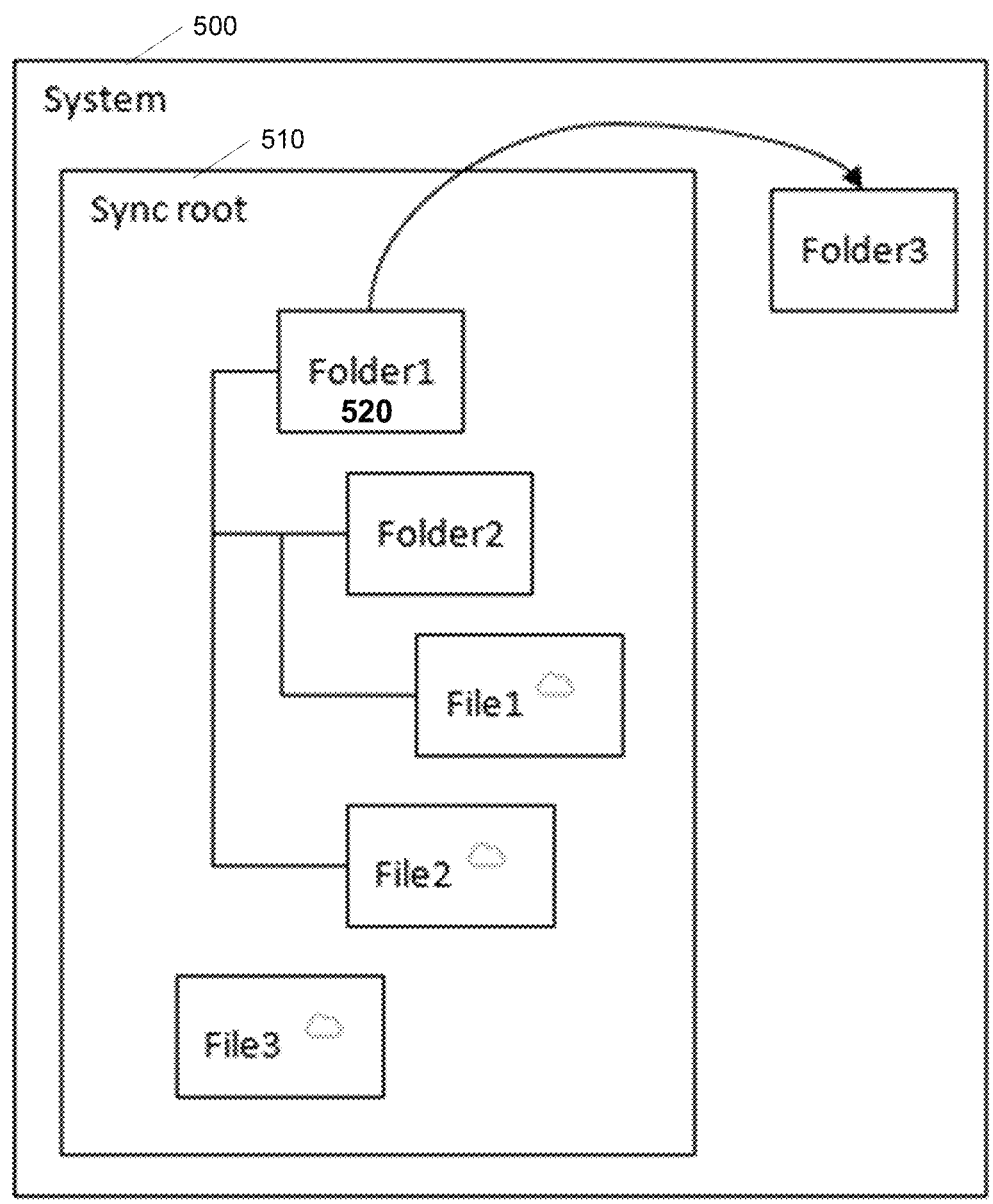
FIG. 5 is an example scenario of a folder move from within the sync root to outside the sync root.

The file system is typically not static and may undergo changes while a folder hydration is taking place. Once the list of files to hydrate is captured in user space, the folder topology can change, making the list stale. Some of the following provides examples of topological changes during folder hydration. One example is shown in FIG. 5. In this scenario, Folder1 is moving out of the synchronization root 510 of system 500, under Folder3. Folder1 has two dehydrated descendants files (marked with the Cloud icon), thus Folder1 should be hydrated before allowing (or denying) the move out to proceed.

Figure 6:
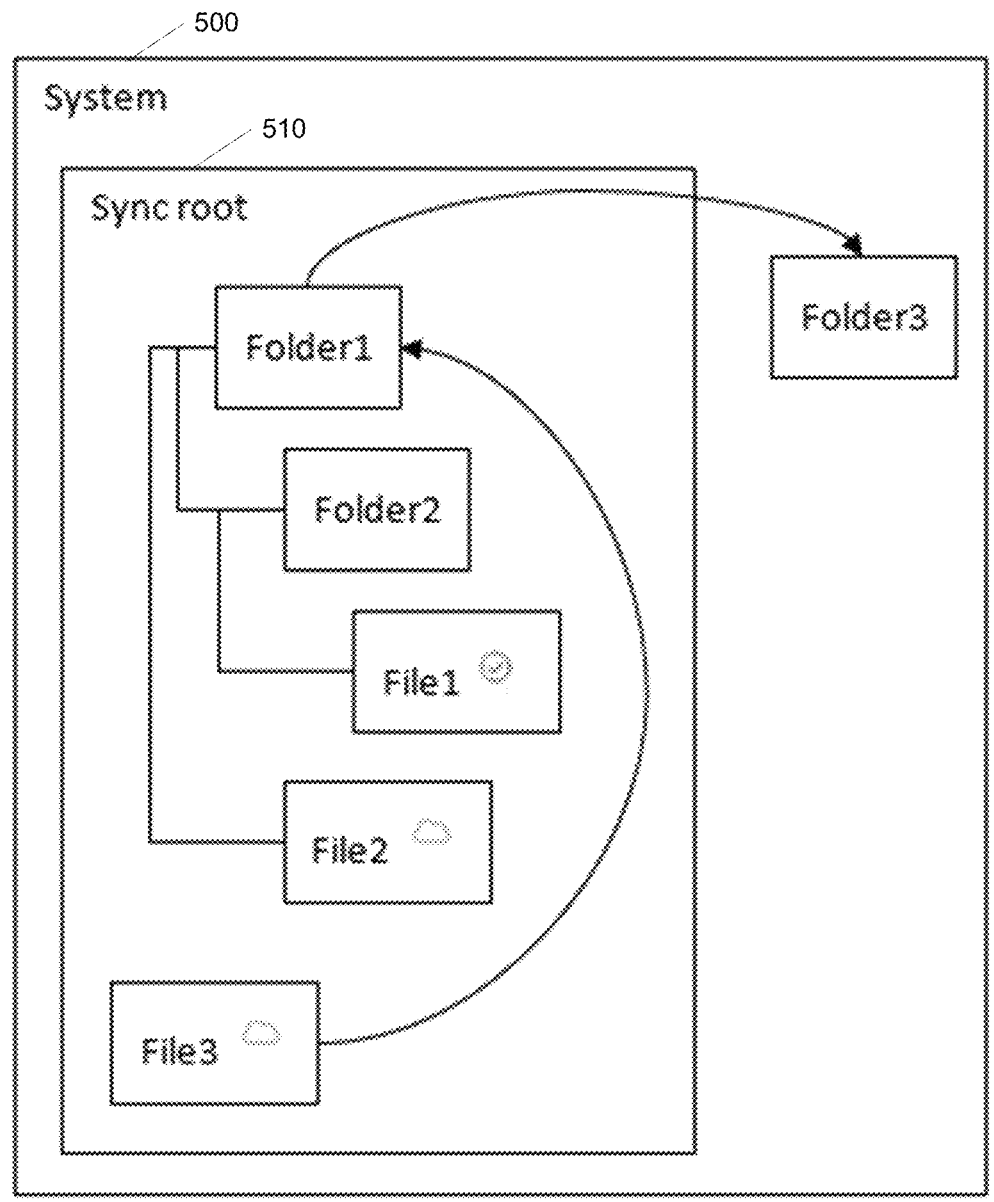
FIG. 6 is an example scenario of a folder operation in accordance with the disclosed embodiments.

FIG. 6 illustrates the hydration of Folder1 (File1 is hydrated, as the green checkmark icon indicates), but a new dehydrated file (File3) is now dropped under Folder1. If the move of the entire folder is not blocked until File3 is hydrated, then Folder1 move will eventually go through (assuming File2 is also successfully hydrated).

Figure 7:
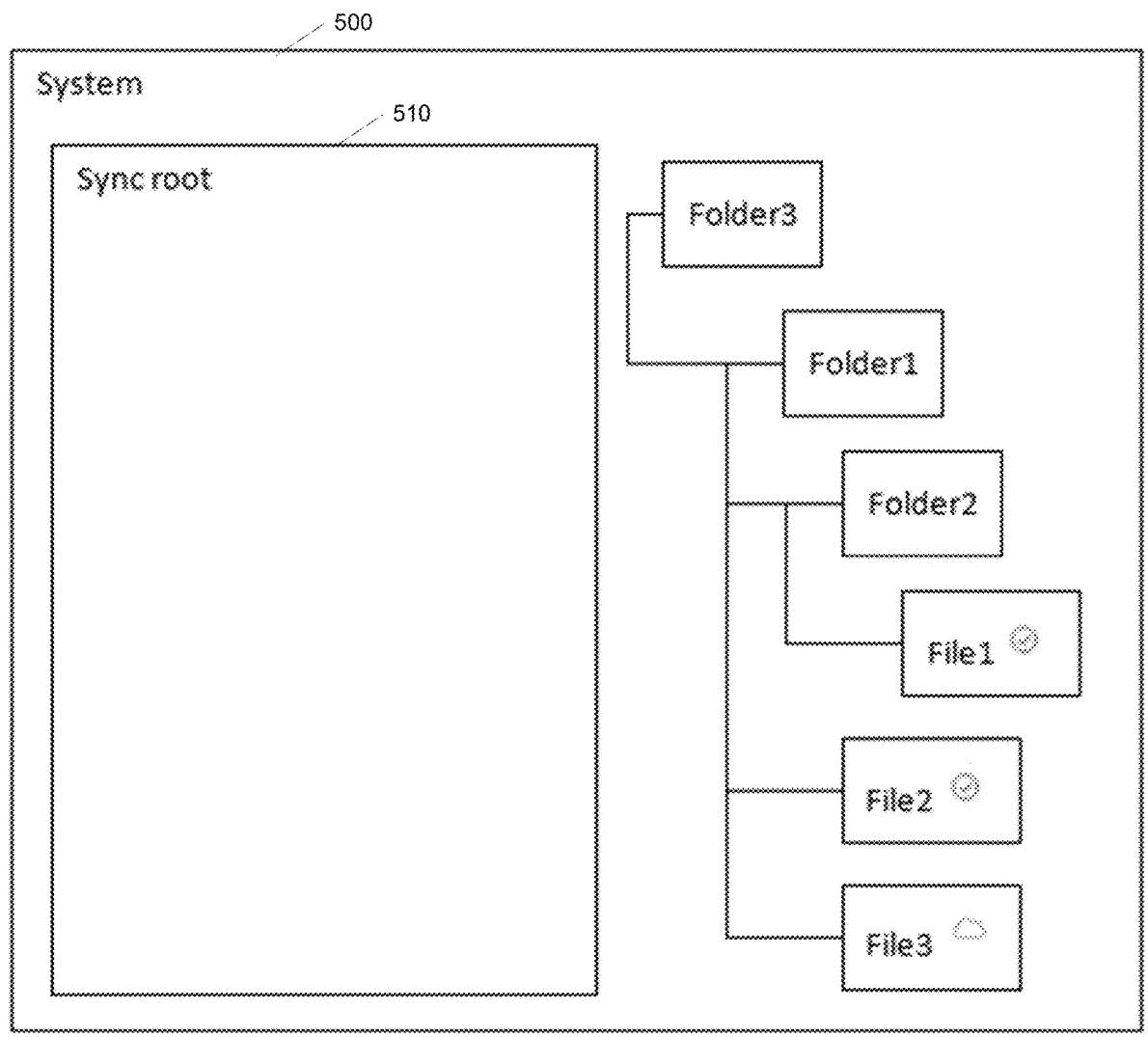
FIG. 7 is an example final state of an operation to be avoided as further described herein.

The result is shown in FIG. 7. As can be seen, File3 is dehydrated and is outside the synchronization root, which may not be allowed.

The following provides one example technique for addressing this issue: for every file system operation that results in an addition (of a dehydrated file/folder) to or a deletion (of a dehydrated file/folder) from a folder that is undergoing hydration, a hydration of that dehydrated file or folder is triggered. This will ensure that the file-system operation which will result in the addition to/deletion from the folder being hydrated will not be realized unless and until the hydration of the file/folder being added/removed is successfully completed. In other words, this prevents the creation of dehydrated files within a folder that is being hydrated.

The following provides example embodiments for implementing the techniques described above.

Since the list of files to hydrate within a folder is not static, a list of descendant file tickets on each folder hydration request ticket may be maintained. This list can then be modified, if needed, by other threads.

In one embodiment, other files may continue to be hydrated if the hydration of one of the files fails. This may prevent additional code and complexity in the kernel code to handle this case differently. Additionally, in this way if a folder is requested to be hydrated, as much of the folder will be hydrated as possible.

In one embodiment, a failure notification may be provided after completion of a hydration attempt if a failure occurs, and after as many files are hydrated as possible. In another embodiment, the failure notification may be provided as soon as the failure is known, while allowing the remaining file hydrations to proceed in the background. In some embodiments, when a failure occurs, hydration may be stopped, and the rest of the descendant files may not be hydrated and any ongoing descendant file hydrations may be halted.

As mentioned previously, the capability to perform folder enumeration may not exist in kernel space. Thus, a kernel extension that implements the described techniques may send a request to the user space to perform the folder enumeration on its behalf and provide the kernel extension with a list of files to hydrate (descendants of the folder to hydrate).

In order to avoid running out of memory for dense folder hierarchies, paged enumeration may be implemented. In this embodiment, the user space will only return a fixed sized list of descendant files. The kernel space may submit requests to the user space for the list of descendant files until the user space responds with an empty list, indicating the end of the enumeration.

In an embodiment, a function may be provided that is configured to wait on a ticket associated with a file hydration and wait for the folder enumeration ticket response.

In an embodiment, a cancellation may be processed if the user space does not respond with the list of files to hydrate, after a given timeout. This timeout can be set to a fixed value because the folder enumeration is paged, and the enumeration request is limited to a fixed sized portion of the hierarchy at a time.

In some embodiments, a progress-reporting mechanism may be provided. In other embodiments, because an implicit progress is provided by virtue of the paged enumeration, an explicit progress-reporting mechanism is not separately implemented.

In an embodiment, a handler of the folder enumeration response may be configured to parse the response buffer and populate the list of files to hydrate, stored on the folder ticket.

In some embodiments, the file system ID that is received in the list populated in user space may be mapped to an equivalent identifier in kernel space.

A function may be implemented that handles the events received from kernel space. In some embodiments, the function may handle the folder enumeration event.

For chunked folder enumeration, a function may be configured to obtain file system attributes for multiple directory entries. Relevant flags may be set to request FSID's to be returned for the entries. The function may be called recursively to enumerate all descendant folders of the given folder. The function may be configured to perform paged enumeration. In an embodiment, the function may be configured to enumerate entries in a given directory and fill the given buffer up to its size. The next call to the function may then resume enumerating the remaining entries, if any. Illustrated below is an example implementation of chunked enumeration using the function, followed by an example enumeration.

```
EnumerateFolder(folderPath)
{
    // Store a list of file descriptors (fd) on the user space ticket
    (TMT).
    // This list will contain the file descriptors associated with the
    different
    // directories that we will need to enumerate. It will at leas
    contain the fd
    // associated with the folderPath, and will grow to contain fd's
    associated with
    // the descendant directories of folderPath, if any.
    // It does not matter whether this list is LIFO or FIFO, because
    what matters
    // is that all of the directories in the hierarchy are enumerated.
    if (ticket.fdList is empty)
    {
        open folderPath
        add fd to ticket.fdList
    }
    while (ticket.fdList is not empty)
    {
        allocate enumerate buf
        allocate files buf (to send to kernel space)
        pick fd from ticket.fdList
        ret = 0
        do
        {
            ret = enumerate
            for (entry in enumerate buf)
            {
                if dehydrated file
                {
                    add to files buf to send to kernel space
                    fileCount++
                }
                if directory
                {
```

-continued

```
                    open
                    add fd to ticket.fdList
                }
            }
            if (fileCount > 0)
            {
                send response to ticket with files
                exit function
            }
        } while (ret != 0)
        // No more entries in this directory => close the fd and
remove it from ticket.fdList
        close(fd)
    }
    // ticket.fdList is empty, send empty file list to kernel space to
indicate end of enumeration
        send response to ticket with empty file list
}
```

In one example, the following hierarchy may be considered:

|_ FolderA
|_ File1
|_ File2
|_ File3
|_ FolderB
|_ FolderC
|_ File4
|_ FolderD

In this example, the buffer that is allocated for enumerate is small enough to contain only FolderB, FolderD, File1 and File2. Following the algorithm above, the first call to EnumerateFolder(FolderA) will yield:

| enumerate | ticket.fdList | List of files to send to kernel space |
| --- | --- | --- |
| Buffer: [File1, File2, FolderB, FolderD] Return value: 4 | [FolderA_fd, FolderB_fd, FolderD_fd] | [File1, File2] |

The second call to EnumerateFolder(FolderA) will yield:

| enumerate | ticket.fdList | List of files to send to kernel space |
| --- | --- | --- |
| Buffer: [File3] Return value: 1 | [FolderA_fd, FolderB_fd, FolderD_fd] | [File3] |

The third call to EnumerateFolder(FolderA) will first yield:

| enumerate | ticket.fdList | List of files to send to kernel space |
| --- | --- | --- |
| Buffer: [ ] Return value: 0 | [FolderB_fd, FolderD_fd] | [ ] |

Because the function returned 0, proceed to opening the next file descriptor from the list (FolderB_fd). Thus, this third call to EnumerateFolder(FolderA) will eventually yield:

| enumerate | ticket.fdList | List of files to send to kernel space |
|---|---|---|
| Buffer: [File4, FolderC] Return value: 2 | [FolderB_fd, FolderD_fd, FolderC_fd] | [File4] |

The fourth call to EnumerateFolder(FolderA) will first yield:

| enumerate | ticket.fdList | List of files to send to kernel space |
|---|---|---|
| Buffer: [ ] Return value: 0 | [FolderD_fd, FolderC_fd] | [ ] |

Because enumerate returned 0, we will proceed to opening the next file descriptor from the list (FolderD_fd). Thus, this fourth call to EnumerateFolder(FolderA) will yield

| enumerate | ticket.fdList | List of files to send to kernel space |
|---|---|---|
| Buffer: [ ] Return value: 0 | [FolderC_fd] | [ ] |

Because the function returned 0, proceed to opening the next file descriptor from the list (FolderC_fd). Thus, this fourth call to EnumerateFolder(FolderA) will eventually yield:

| enumerate | ticket.fdList | List of files to send to kernel space |
|---|---|---|
| Buffer: [ ] Return value: 0 | [ ] | [ ] |

The list of file descriptors is now empty. The operation is concluded by sending an empty list of files to kernel space. This indicates the end of enumeration.

Topological changes can occur after the list of files to hydrate has been received by the kernel code extension from user space.

The following provides example scenarios pertaining to a folder hydration. In the figures, a circle around a file signifies that it has been captured during the initial folder enumeration as a file to hydrate. Dashed lines indicate the topological change of interest that is about to occur during the folder hydration.

Figure 8:
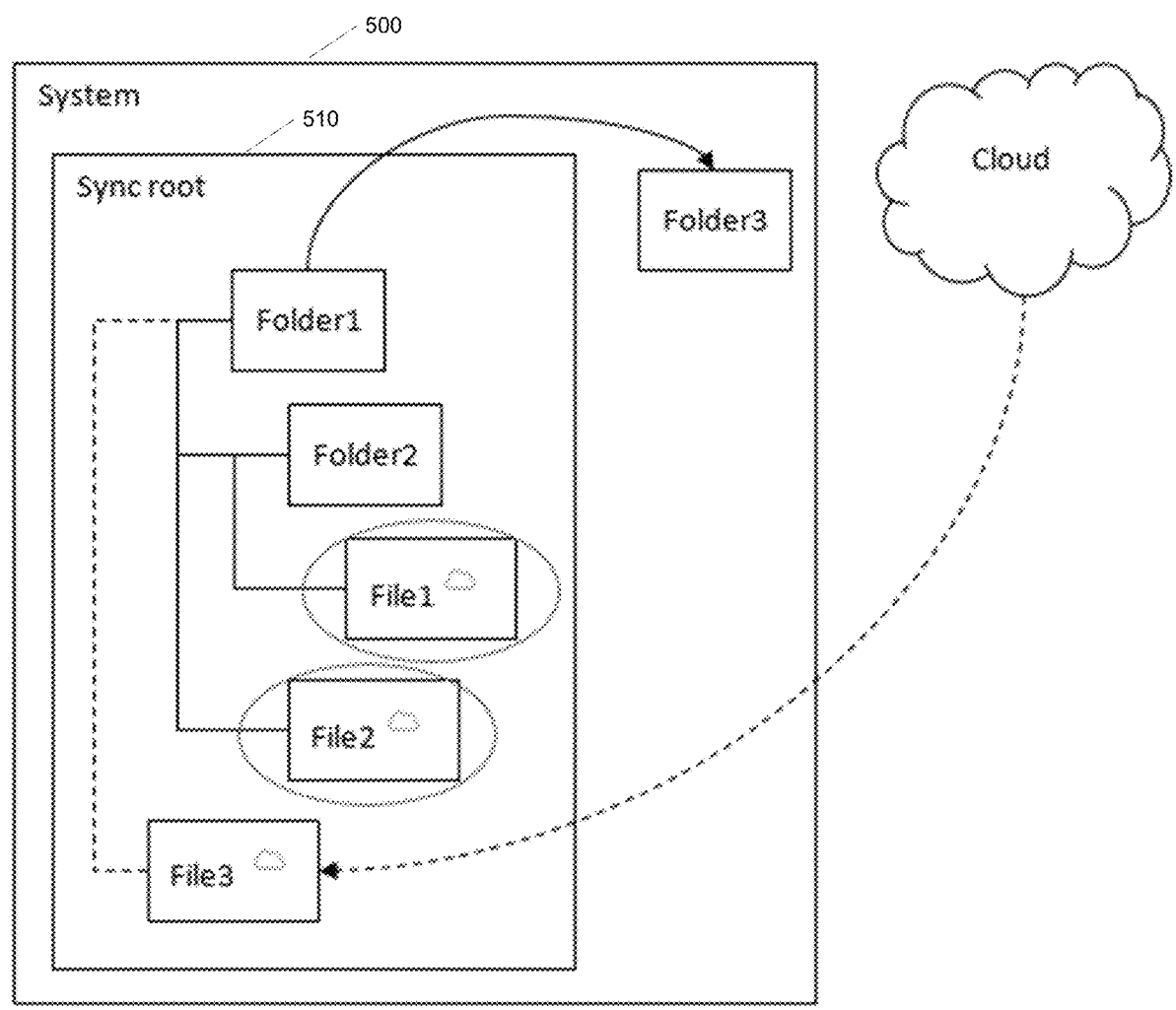
FIG. 8 is an example scenario of a folder operation in accordance with the disclosed embodiments.

Scenario 1—Addition of Dehydrated Files to the Hierarchy of Folder being Hydrated In one example, folder 1 is undergoing hydration (for example, as a result of moving out of the synchronization root). The list of files to hydrate has been received from user space. Before the folder hydration completes, it is discovered that a dehydrated file is about to be added to the hierarchy of the folder. This can be caused in various circumstances:

Referring to FIG. 8, a file (indicated as File3) has been created on the cloud and is being realized as a dehydrated placeholder within folder 1.

Figure 9:
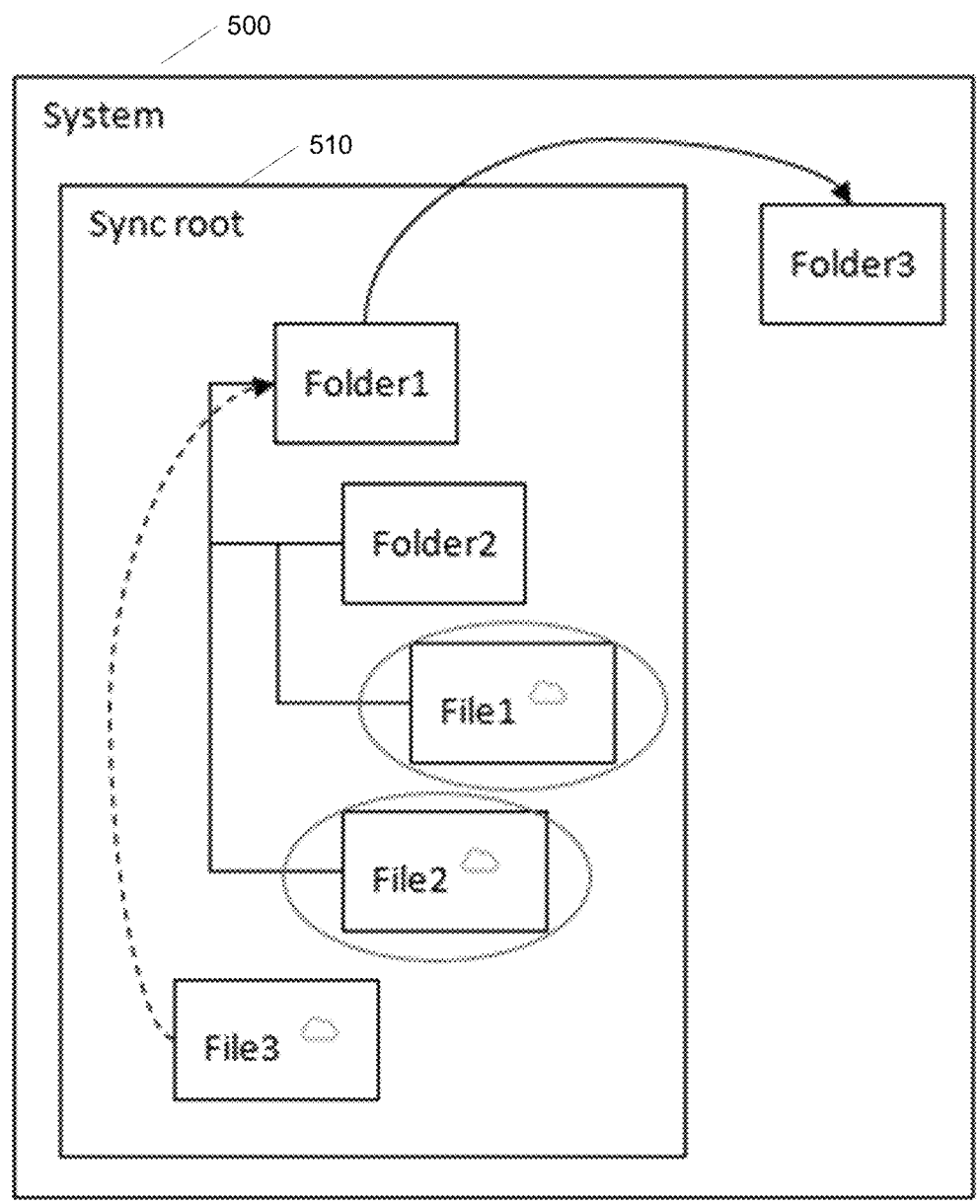
FIG. 9 is an example scenario of a folder operation in accordance with the disclosed embodiments.

Referring to FIG. 9, a dehydrated file is being moved from a given location within the synchronization root 510 to Folder 1.

Figure 10:
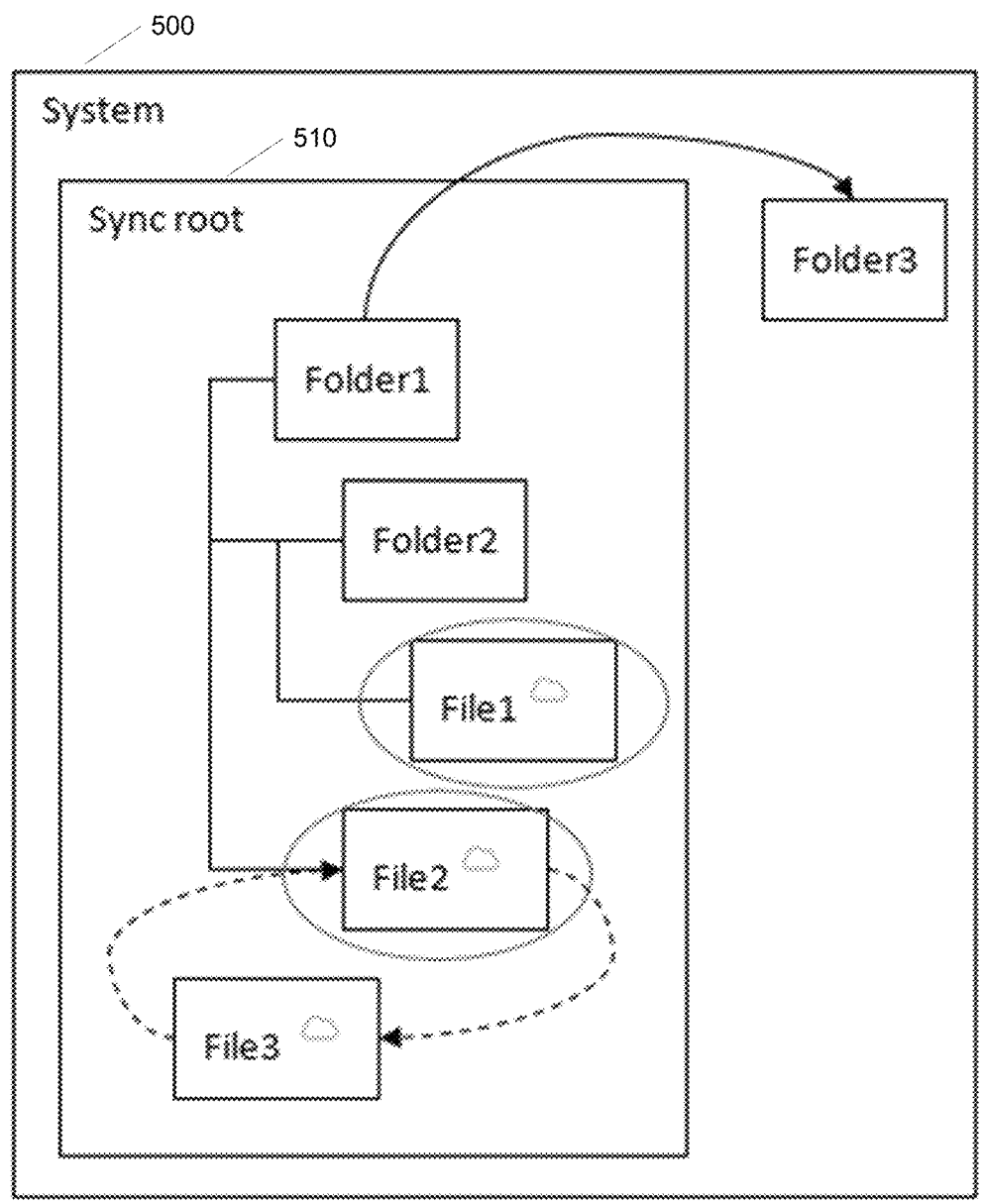
FIG. 10 is an example scenario of a folder operation in accordance with the disclosed embodiments.

Referring to FIG. 10, a dehydrated file File3 within the synchronization root 510 is being swapped with a file File2 (dehydrated or hydrated) under folder 1.

In some embodiments, for every move and swap operation within the synchronization root, the target folder may be examined to determine whether it lies within the hierarchy of a folder that is undergoing hydration. If that is the case, hydrations may be triggered for the file that is being moved/swapped.

For the case of file addition, since placeholder creation may be handled entirely in the kernel code, the parent node may be examined (of the file that is being created) and it may be determined if the parent is one that lies within the hierarchy of a folder that is undergoing hydration. If that is the case one may either fail the creation operation or do A and B below:

A. Queue hydration for the placeholder. Hide the identity of the actual process (which will be the provider) by using a fake identity.

B. Add the file hydration ticket to the list of descendant tickets of the ascendant folder that is undergoing hydration.

By proceeding in this manner, it can be ensured that the file is hydrated (in case of move/swap) before its addition to the folder is realized. This is because the operation (move/swap) will be blocked until the file is hydrated. If hydration fails, the operation will be simply denied, and the file never added to the folder hierarchy.

The handling for the addition scenario may be provided by a function that continues checking the list of file hydration tickets to wait on, until there is no more remaining. If A and B are not performed and instead the creation fails, then this should not be needed.

Figure 11:
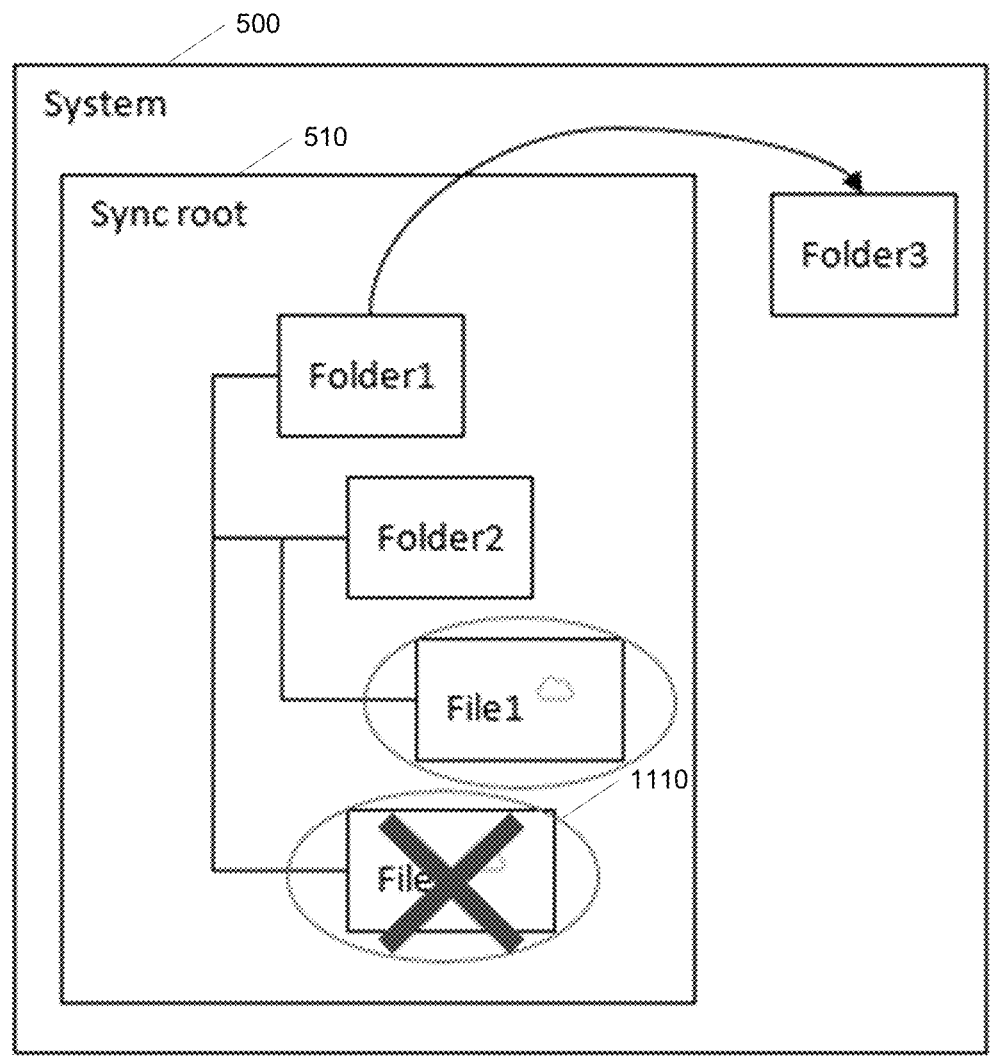
FIG. 11 is an example scenario of a folder operation in accordance with the disclosed embodiments.

Scenario 2—Removal of Dehydrated Files from the Hierarchy of Folder being Hydrated In this scenario, folder 1 is undergoing hydration (for example, as a result of moving out of the synchronization root). The list of files to hydrate has been received from user space. Before the folder hydration completes, it is discovered that a dehydrated file is about to be removed from the hierarchy of the folder. This can be caused in various circumstances:

Referring to FIG. 11, the file 1110 is being deleted from disk.

Figure 12:
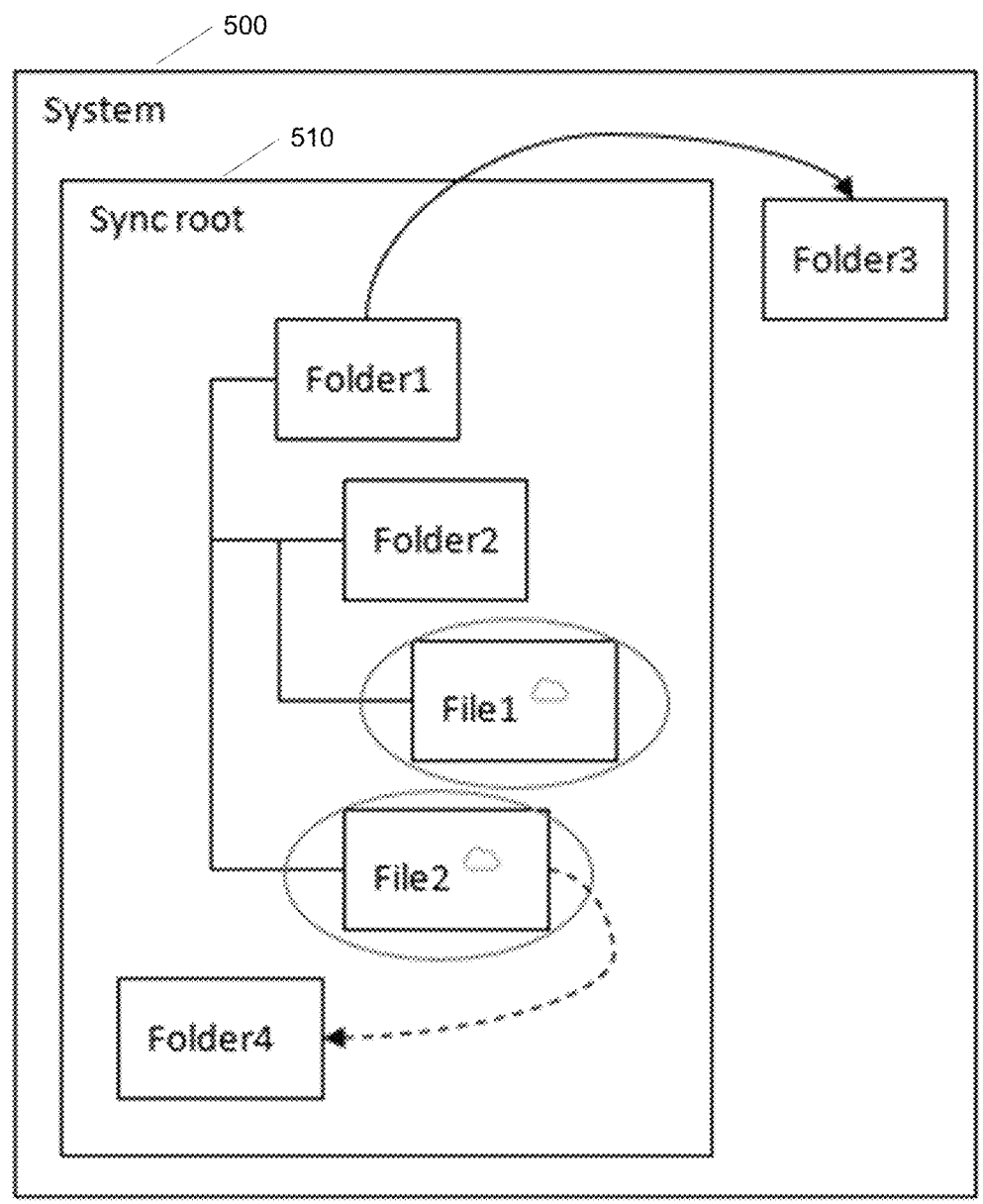
FIG. 12 is an example scenario of a folder operation in accordance with the disclosed embodiments.

Referring to FIG. 12, the file File2 is being moved out of the hierarchy of folder Folder1 to another location Folder4 that is within the synchronization root.

Figure 13:
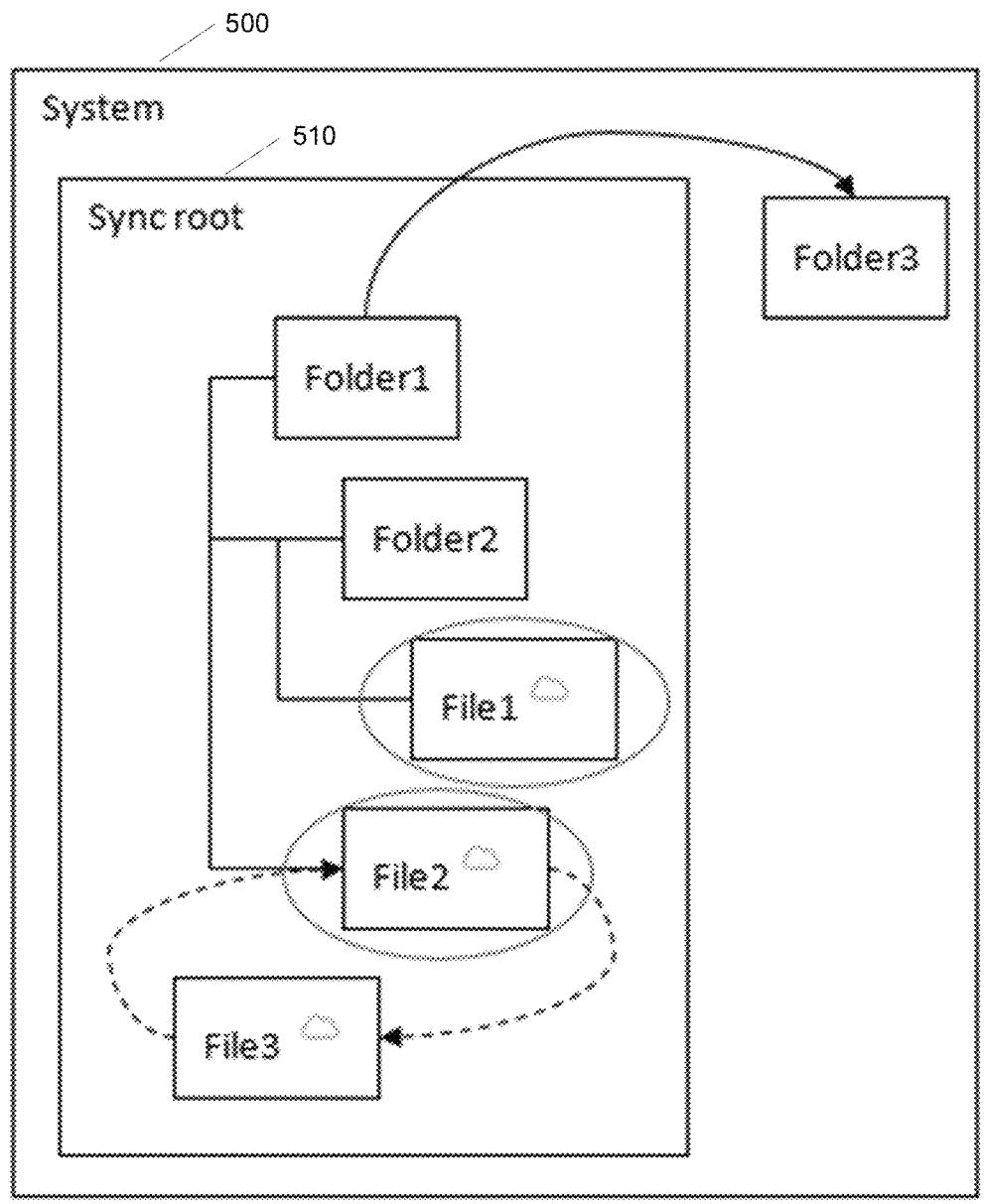
FIG. 13 is an example scenario of a folder operation in accordance with the disclosed embodiments.

Referring to FIG. 13, the file File3 is being swapped with a file File2 (dehydrated or hydrated) that within the synchronization root under folder Folder1.

In one embodiment, these scenarios may be handled as described in the first scenario above. In other words, if a move/swap is taking place within the synchronization root, hydration of the file may be triggered if the origin of the move/swap is within the hierarchy of a folder that is undergoing hydration. Additionally, hydration on delete of any file that is within the hierarchy of a folder that is undergoing hydration may be triggered. This hydration may take place by virtue of the move of the file to the recycle bin (trash) which is out of the synchronization root. If the delete does not go to the recycle bin, there may be no need for hydration. This may also be applicable to folders.

In another embodiment, an additional list of removed descendant files on the folder ticket may be populated. Any file that would leave the hierarchy of the folder may be added on this list. Before queuing up any hydration request, the folder hydration algorithm may first examine this list. If the file resides within this list, then hydration would not be queued for the file.

By proceeding as described above, it can be ensured that the file is hydrated (in case of delete/move/swap) before its removal from the folder is realized.

Figure 14:
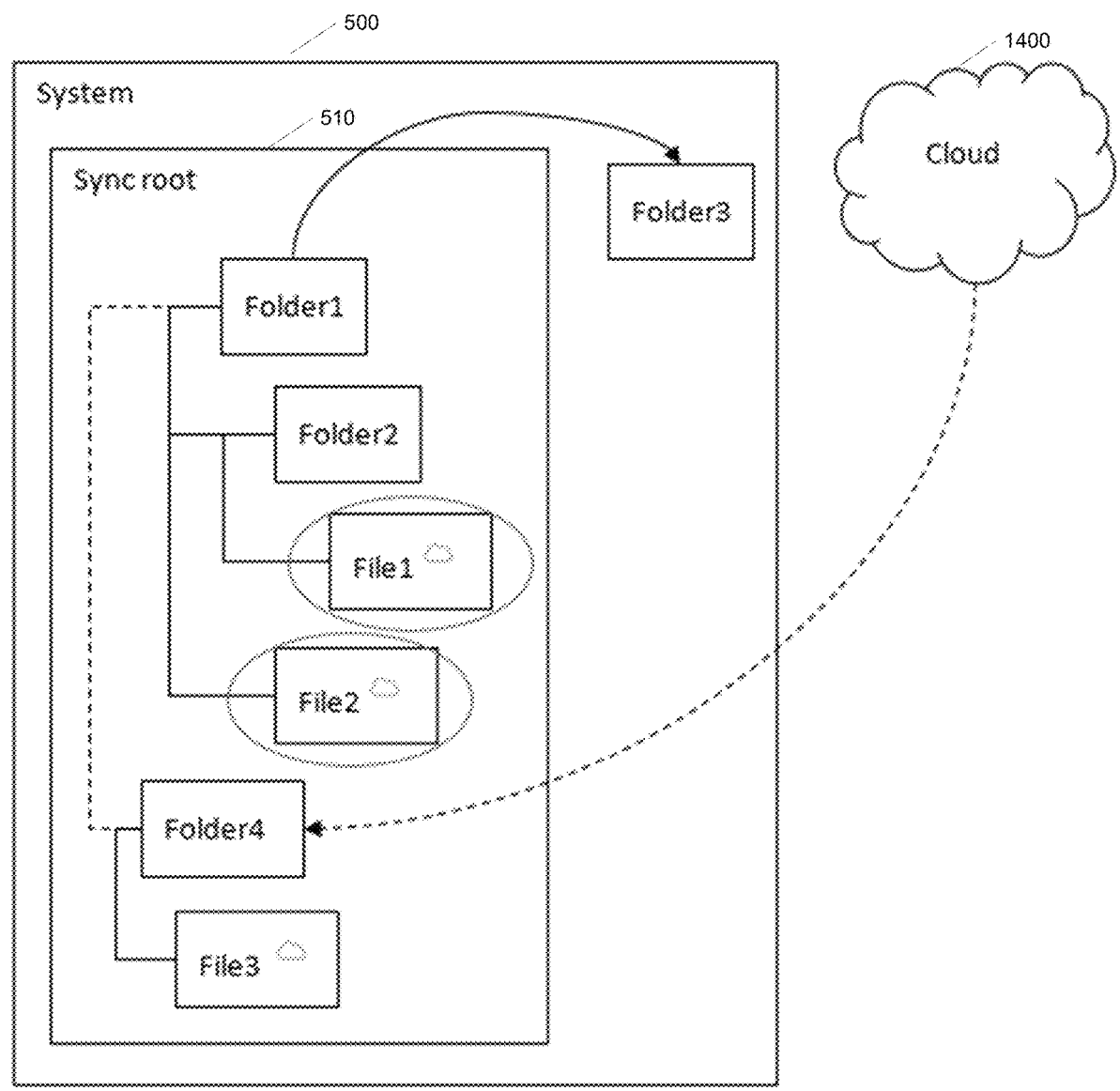
FIG. 14 is an example scenario of a folder operation in accordance with the disclosed embodiments.

Scenario 3—Addition of Dehydrated Folders to the Hierarchy of Folder being Hydrated In one example, folder 1 is undergoing hydration (for example, as a result of moving out of the synchronization root). The list of files to hydrate has been received from user space. Before the folder hydration completes, it is discovered that a dehydrated folder (i.e. one that has one or more dehydrated descendant files) is about to be added to the hierarchy of the folder. This can be caused in various circumstances:

Referring to FIG. 14, folder Folder4 (and its descendant files) has been created in the cloud 1400 and is being realized within folder Folder1.

Figure 15:
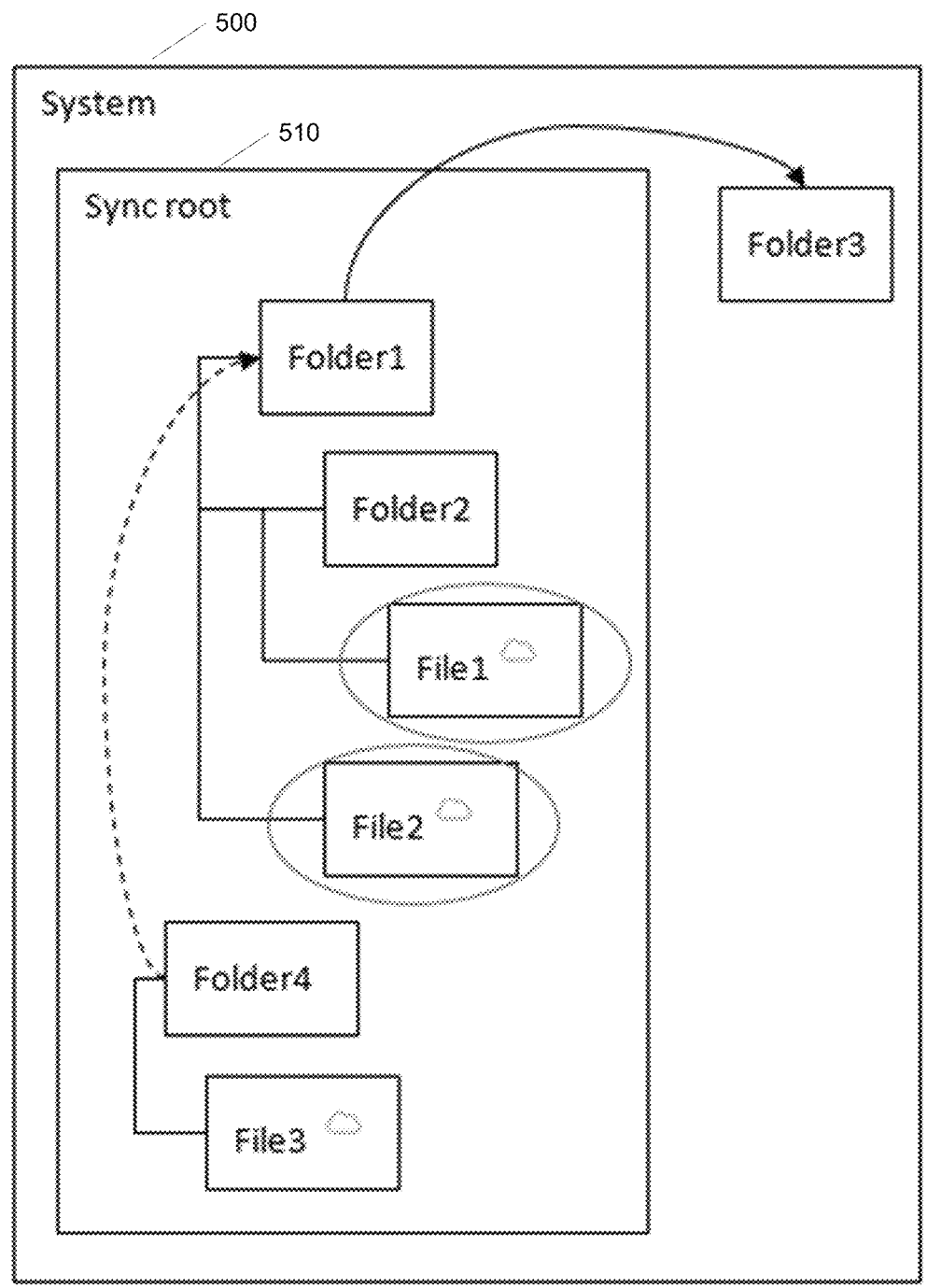
FIG. 15 is an example scenario of a folder operation in accordance with the disclosed embodiments.

Referring to FIG. 15, folder Folder4 is a dehydrated folder that is being moved from a given location within the synchronization root 510 to folder Folder1.

Figure 16:
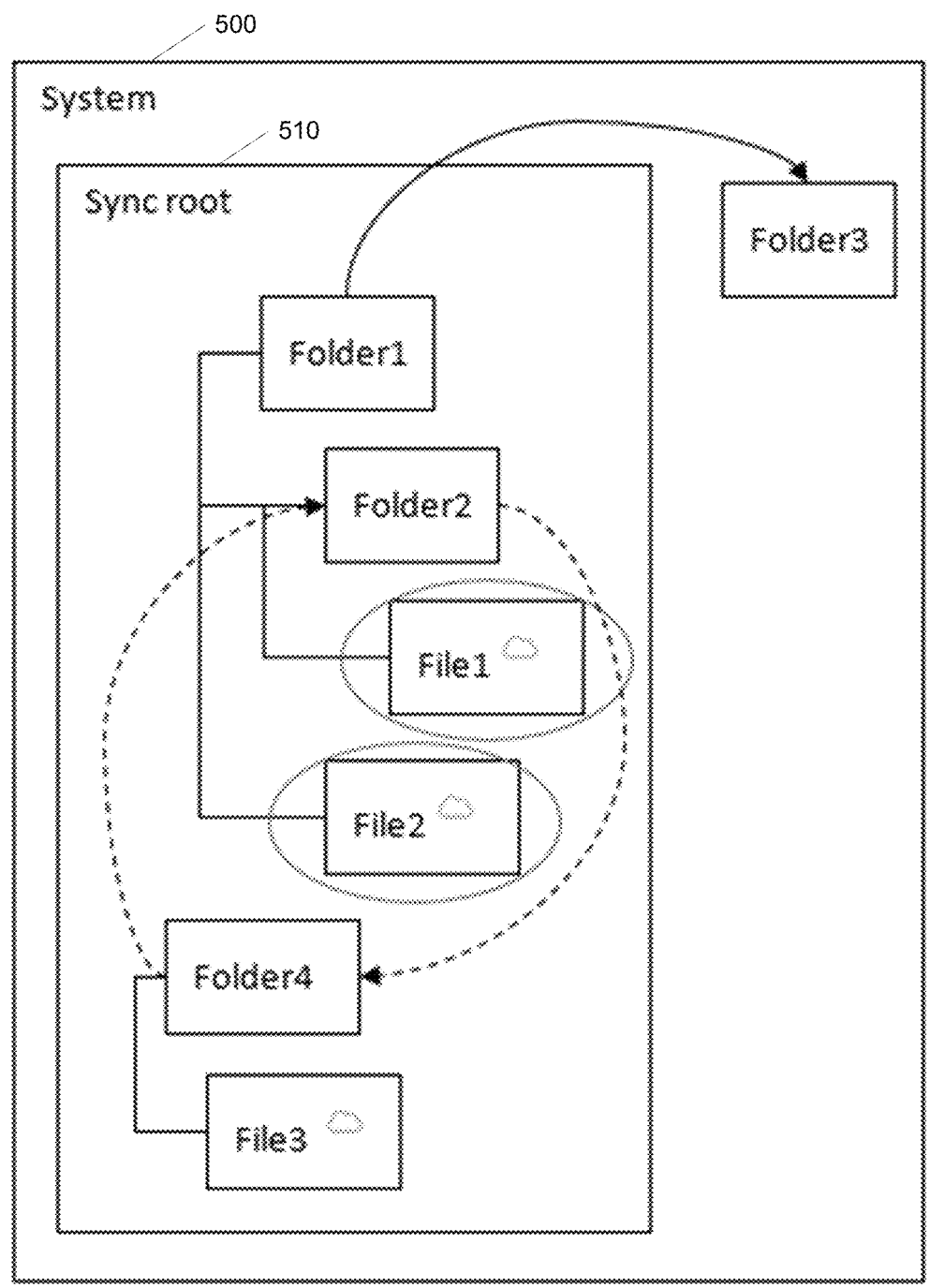
FIG. 16 is an example scenario of a folder operation in accordance with the disclosed embodiments.

Referring to FIG. 16, folder Folder4 is a dehydrated folder within the synchronization root 510 that is being swapped with another folder Folder2 (dehydrated or hydrated) under folder Folder1.

If a folder move/swap is taking place within the synchronization root, hydration of the folder may be triggered if the destination of the move/swap is within the hierarchy of a folder that is undergoing hydration. The addition of each of the descendant files (if any) may be taken care of by the file addition handling.

Figure 17:
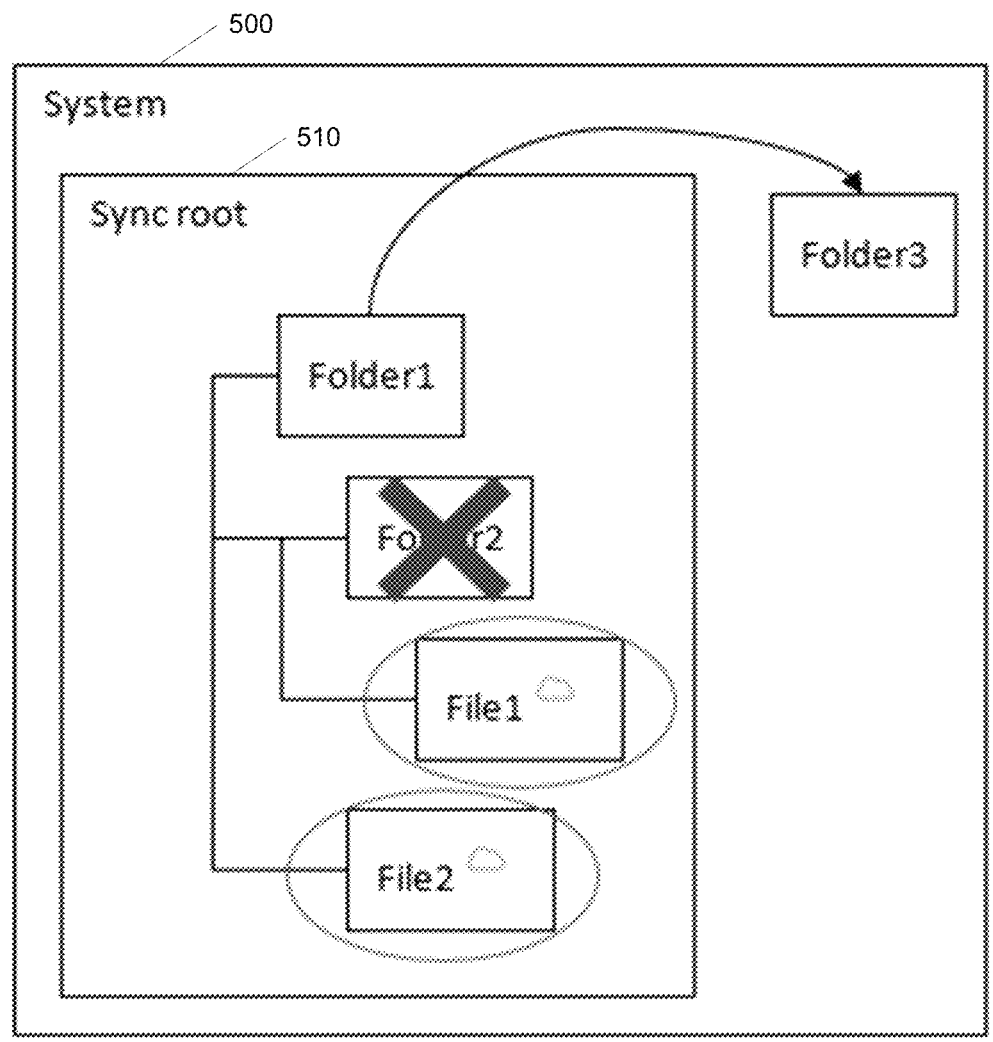
FIG. 17 is an example scenario of a folder operation in accordance with the disclosed embodiments.

Scenario 4—Removal of Dehydrated Folders from the Hierarchy of Folder being Hydrated In one example, folder 1 is undergoing hydration (for example, as a result of moving out of the synchronization root). The list of files to hydrate has been received from user space. Before the folder hydration completes, it is discovered that a dehydrated folder (i.e. one that has one or more dehydrated descendant files) is about to be removed from the hierarchy of folder 1. This can be caused in various circumstances:

Referring to FIG. 17, folder Folder2 is being deleted from disk.

Figure 18:
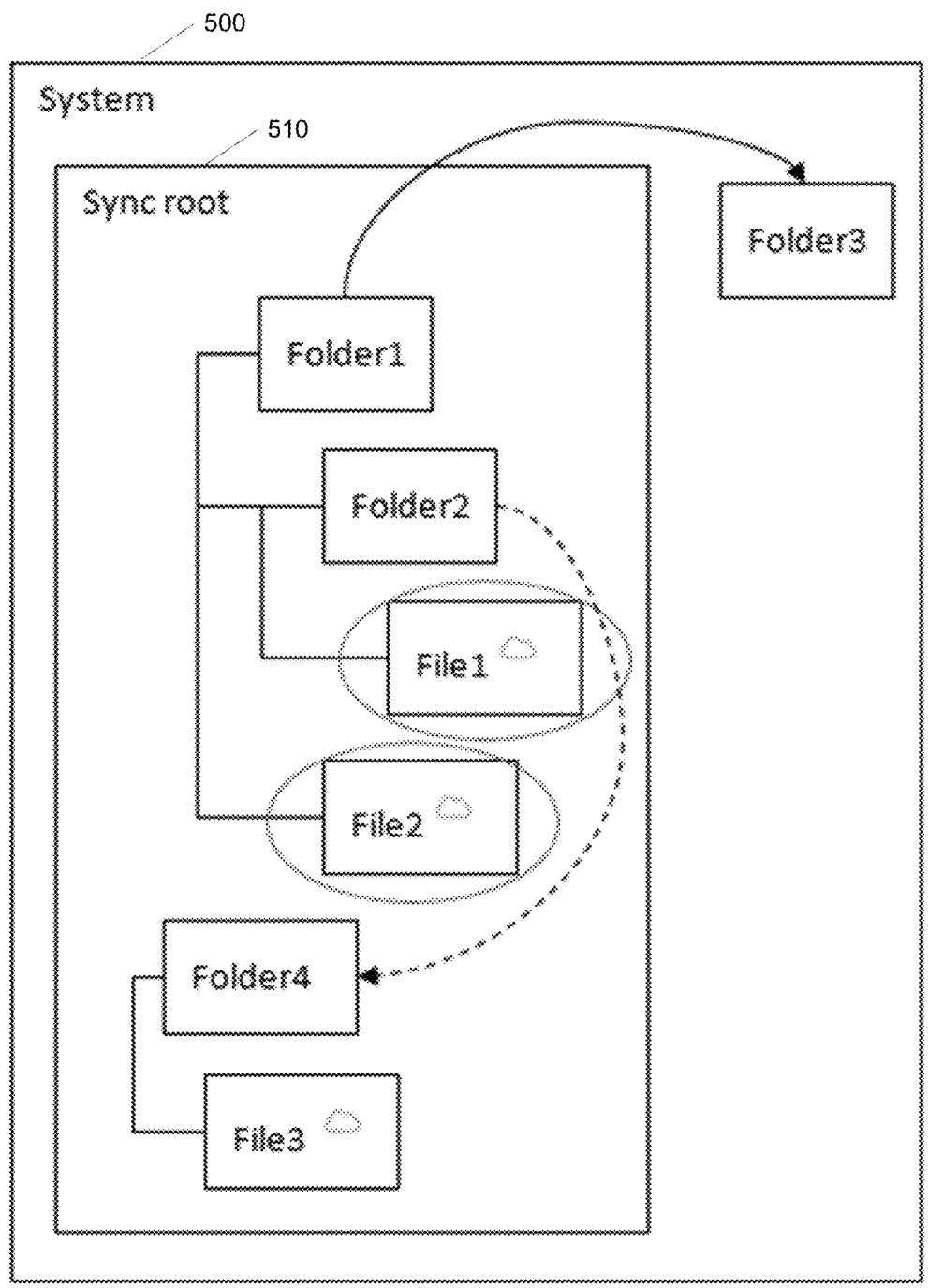
FIG. 18 is an example scenario of a folder operation in accordance with the disclosed embodiments.

Referring to FIG. 18, folder Folder2 is being moved out of the hierarchy of folder 1 to another location within the synchronization root 510, shown as Folder4.

Figure 19:
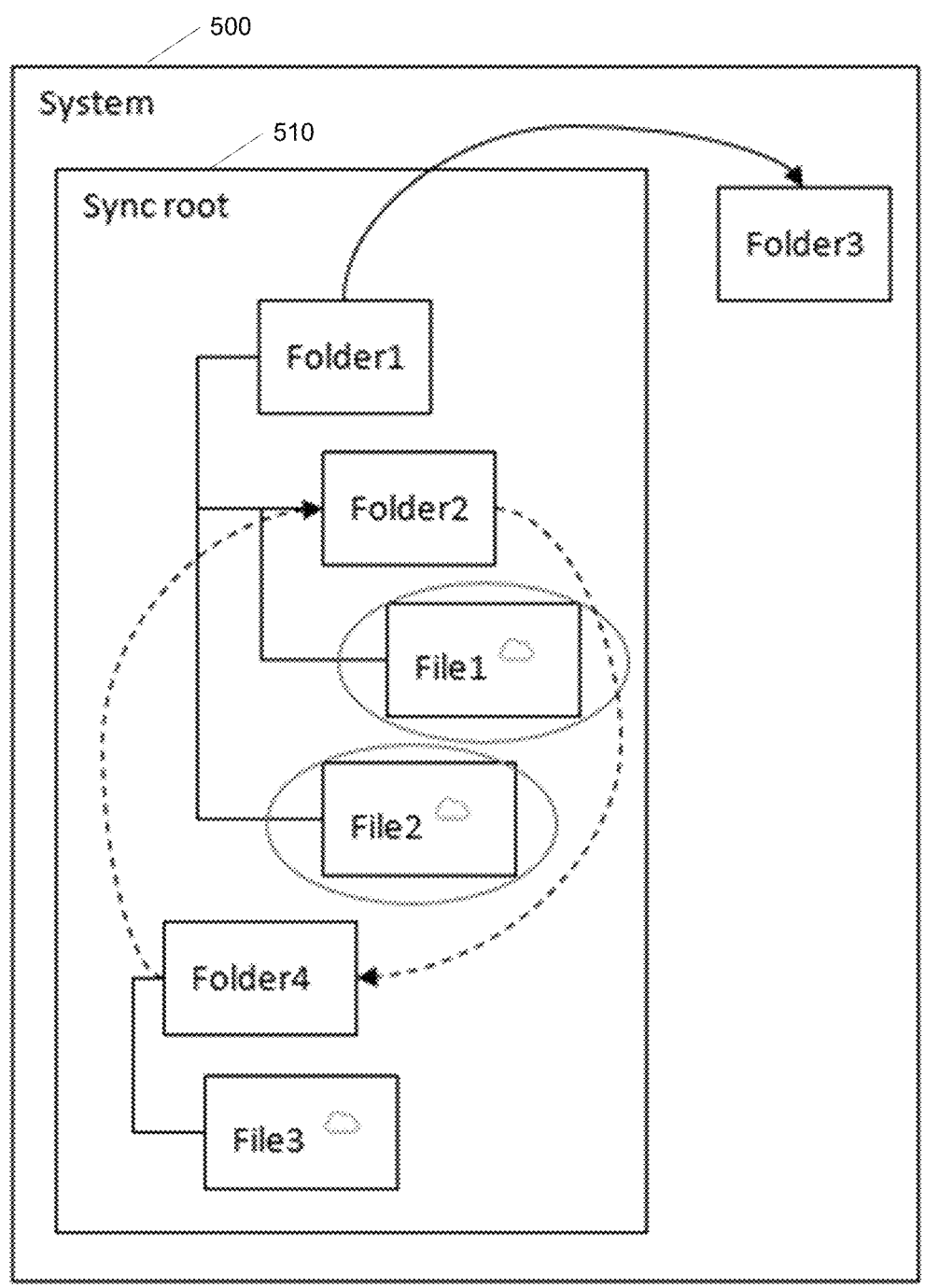
FIG. 19 is an example scenario of a folder operation in accordance with the disclosed embodiments.

Referring to FIG. 19, folder Folder2 is being swapped with another folder Folder4 (dehydrated or hydrated) within the synchronization root 510.

In an embodiment, if a folder move/swap is taking place within the synchronization root, hydration of the folder may be triggered if the origin of the move/swap is within the hierarchy of a folder that is undergoing hydration. Additionally, hydration may be triggered on delete of any folder that is within the hierarchy of a folder that is undergoing hydration.

In one embodiment, if a secondary list of removed files is updated, the same could be performed for folders, by updating that list with the descendants of folder B.

Scenario 5—Dehydration within the Hierarchy of Folder being Hydrated

In this example, dehydration of one or more hydrated files within a folder that is undergoing hydration is taking place. In one embodiment, the dehydration request (that will be sent by user space and handled in kernel space) may be failed with a specific code. Appropriate status bits may be updated to stop retrying.

A function may be implemented to determine if a file/folder belongs to a folder that is undergoing hydration.

In some embodiments, folder hydrations may be triggered on delete.

Figure 20:
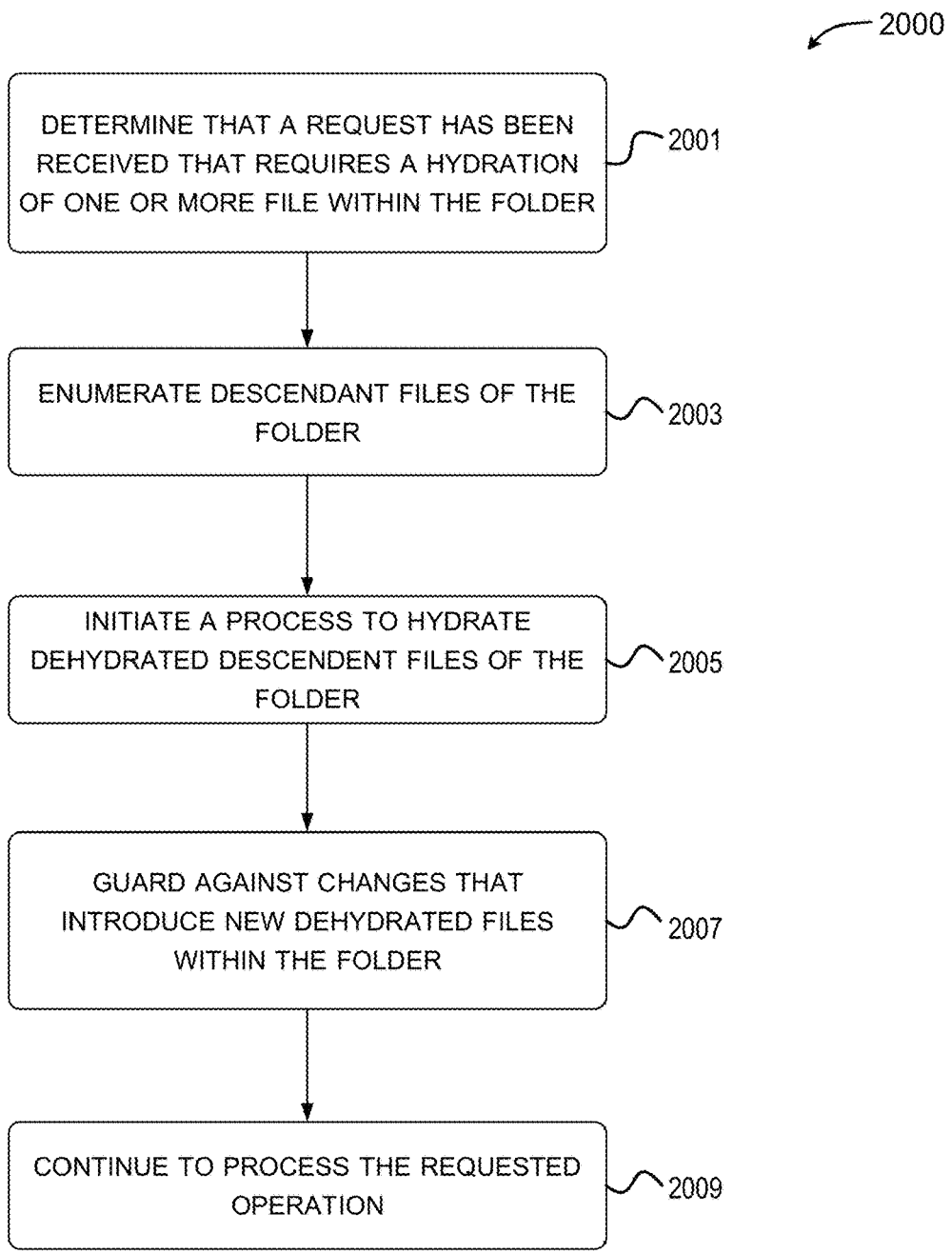
FIG. 20 is a flowchart depicting an example procedure for implementing a method in accordance with the present disclosure.

FIG. 20 illustrates aspects of a routine 2000 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 2000 are described herein as being implemented, at least in part, by modules running the features disclosed herein and can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 2000 may be also implemented in many other ways. For example, the routine 2000 may be implemented, at least in part, by a processor of another remote computer or a local circuit. In addition, one or more of the operations of the routine 2000 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The operations in FIG. 20 can be performed, for example, by the computing device 116 of FIG. 1, as described above with respect to any one of FIGS. 1-19.

At operation 2001, it is determined that a request for an operation on a folder has been received that requires a hydration of one or more files within the folder.

At operation 2003, descendant files of the folder are enumerated.

At operation 2005, a process to hydrate dehydrated descendent files of the folder is initiated.

At operation 2007, during the process, changes that introduce new dehydrated files within the folder are guarded against.

At operation 2009, in response to an indication that hydrations for the folder are completed, the requested operation is continued to be processed.

Figure 21:
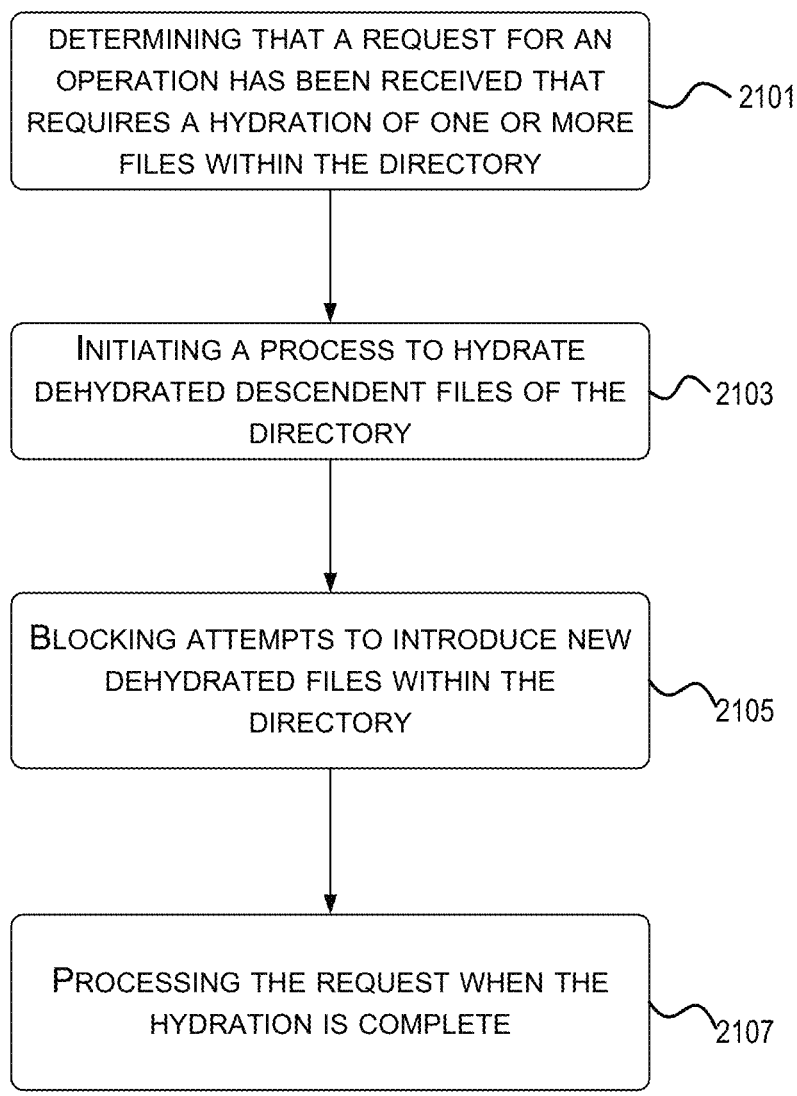
FIG. 21 is a flowchart depicting an example procedure for implementing a method in accordance with the present disclosure.

FIG. 21 illustrates aspects of a routine 2100 for enabling aspects of the techniques disclosed herein as shown and described below. The operations in FIG. 21 can be performed, for example, by the computing device 116 of FIG. 1, as described above with respect to any one of FIGS. 1-19.

At operation 2101, it is determined that a request for an operation on a directory has been received that requires a hydration of one or more files within the directory.

At operation 2103, a process to hydrate dehydrated descendent files of the directory is initiated.

At operation 2105, during the hydration process, attempts to dehydrate or move files within the directory are blocked.

At operation 2107, the request is processed when the hydration is complete.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

EXAMPLE CLAUSES

The disclosure presented herein may be considered in view of the following clauses.

Example Clause A, a device comprising:
one or more processors;
a memory in communication with the one or more processors, the memory having computer-readable instructions stored thereupon which, when executed by the one or more processors, cause the device to:
determine that a request for an operation on a folder has been received that requires a hydration of one or more files within the folder;
enumerate descendant files of the folder;
initiate a process to hydrate dehydrated descendent files of the folder;
during the process, guard against changes that introduce new dehydrated files within the folder; and
in response to an indication that hydrations for the folder are completed, continue to process the requested operation.

Example Clause B, the device of Example Clause A, wherein the process to hydrate dehydrated descendent files comprises hydrating subsets of the descendent files until all of the descendent files are hydrated.

Example Clause C, the device of Example Clause B, wherein a topology change under the folder triggers a further hydration on affected files of the folder.

Example Clause D, the device of any one of Example Clauses A through C, wherein adding a subdirectory with dehydrated files to the folder triggers a further hydration of the added subdirectory.

Example Clause E, the device of any one of Example Clauses A through D, wherein when a file is created, moved, or deleted, parent directories for the created, moved, or deleted file is traversed to determine if a parent has an active hydration request.

Example Clause F, the device of any one of Example Clauses A through D, wherein the process to hydrate dehydrated descendent files is cancelled based on one or more conditions.

Example Clause G, the device of any one of Example Clauses A through F, wherein a time-to-live (TTL) is associated with the process to indicate when to stop the process.

Example Clause H, the device of any one of Example Clauses A through G, wherein the request is received in kernel space and the process to hydrate dehydrated descendent files is performed in user space.

Example Clause I, the device of any one of Example Clauses A through G,
further comprising computer-readable instructions stored thereupon which, when executed by the one or more processors, cause the device to:
block the requested operation when the hydration is needed before the operation completes; and
unblock the requested operation in response to the indication that hydrations for the folder are completed.

Example Clause J, the device of any one of Example Clauses A through I, wherein the subsets comprise a fixed number of descendant files, and wherein hydration is performed for each subset until an indication is received that there are no more descendant files.

Example Clause K, the method of any one of Example Clauses A through J, wherein a file system operation that results in an addition of a dehydrated file or folder to or a deletion of a dehydrated file or folder from the folder that is undergoing hydration triggers a hydration of that dehydrated file or folder.

While Example Clauses A through K are described above with respect to a device, it is understood in the context of this disclosure that the subject matter of Example Clauses A through L can additionally or alternatively be implemented as a method, system, or via computer readable storage media.

Example Clause L, a computing device comprising:
one or more processors;
a memory in communication with the one or more processors, the memory having computer-readable instructions stored thereupon which, when executed by the one or more processors, cause the computing device to:
determining that a request for an operation on a directory has been received that requires a hydration of one or more files within the directory;
initiating a process to hydrate dehydrated descendent files of the directory;
during the hydration process, blocking attempts to dehydrate or move files within the directory; and
processing the request when the hydration is complete.

Example Clause M, the computing device of Example Clause L, further comprising initiating hydration functions between kernel space and user space to cause the hydration.

Example Clause N, the computing device of Example Clause L or Example Clause M, further comprising blocking the requested operation until the hydration is complete.

Example Clause O, the computing device of Example Clauses L through Example Clause N, wherein the operation is a move or swap operation within a synchronization root, further comprising determining that a target folder lies within a hierarchy of a folder that is undergoing hydration.

Example Clause P, the computing device of Example Clauses L through Example Clause O, further comprising determining that a change to a directory structure requires further hydration of the directory.

Example Clause Q, the computing device of Example Clauses L through Example Clause P, wherein the change to the directory structure comprises a file system operation that results in an addition of a dehydrated file or folder to or a deletion of a dehydrated file or folder from the folder that is undergoing hydration.

Example Clause R, the computing device of Example Clauses L through Example Clause Q, wherein the determining comprises traversing parent directories when a file is created, moved, or deleted to determine if a parent is being hydrated.

While Example Clauses L through R are described above with respect to a computing device, it is understood in the context of this disclosure that the subject matter of Example Clauses L through R can additionally or alternatively be implemented by a method or via computer readable storage media.

Example Clause S, a computer-implemented method, comprising
    determining that a request for an operation on a folder has been received that requires a hydration of more than one file within the folder;
    initiating a process to hydrate dehydrated descendent files of the folder;
    during the hydration process, blocking attempts to dehydrate or move files within the folder;
    and
    processing the request when the hydration is complete.

Example Clause T, the device of Example Clause S, further comprising instructions that, when executed by a computing device, cause the computing device to perform operations comprising: implementing a communication mechanism between kernel space and user space that allows for the directory information to be communicated between the kernel space and the user space.

While Example Clauses S through T are described above with respect to a method, it is understood in the context of this disclosure that the subject matter of Example Clauses S through T can additionally or alternatively be implemented as a device or via computer readable storage media.

What is claimed is:

1. A device comprising:
    one or more processors;
    a memory in communication with the one or more processors, the memory having computer-readable instructions stored thereupon which, when executed by the one or more processors, cause the device to:
        in response to determining that a request for an operation on a folder has been received that requires a hydration of one or more files within the folder;
        enumerate descendant files of the folder;
        initiate a process to hydrate dehydrated descendent files of the folder; and
        during the process, block attempts to introduce new dehydrated files within the folder; and
    in response to an indication that hydrations for the folder are completed, continue to process the requested operation.

2. The device of claim 1, wherein the process to hydrate dehydrated descendent files comprises hydrating subsets of the descendent files until all of the descendent files are hydrated.

3. The device of claim 1, wherein a topology change under the folder triggers a further hydration on affected files of the folder.

4. The device of claim 1, wherein adding a subdirectory with dehydrated files to the folder triggers a further hydration of the added subdirectory.

5. The device of claim 1, wherein when a file is created, moved, or deleted, parent directories for the created, moved, or deleted file is traversed to determine if a parent has an active hydration request.

6. The device of claim 1, wherein the process to hydrate dehydrated descendent files is cancelled based on one or more conditions.

7. The device of claim 1, wherein a time-to-live (TTL) is associated with the process to indicate when to stop the process.

8. The device of claim 1, wherein the request is received in kernel space and the process to hydrate dehydrated descendent files is performed in user space.

9. The device of claim 8, further comprising computer-readable instructions stored thereupon which, when executed by the one or more processors, cause the device to:
    block the requested operation when the hydration is needed before the operation completes; and
    unblock the requested operation in response to the indication that hydrations for the folder are completed.

10. The device of claim 2, wherein the subsets comprise a fixed number of descendant files, and wherein hydration is performed for each subset until an indication is received that there are no more descendant files.

11. The device of claim 1, wherein a file system operation that results in an addition of a dehydrated file or folder to or a deletion of a dehydrated file or folder from the folder that is undergoing hydration triggers a hydration of that dehydrated file or folder.

12. A method comprising:
    in response to determining that a request for an operation on a directory has been received that requires a hydration of one or more files within the directory:
        initiating a process to hydrate dehydrated descendent files of the directory; and
        during the hydration process, blocking attempts to introduce new dehydrated files within the directory; and
    processing the request when the hydration is complete.

13. The method of claim 12, further comprising initiating hydration functions between kernel space and user space to cause the hydration.

14. The method of claim 12, further comprising blocking the requested operation until the hydration is complete.

15. The method of claim 12, wherein the operation is a move or swap operation within a synchronization root, further comprising determining that a target folder lies within a hierarchy of a folder that is undergoing hydration.

16. The method of claim 12, further comprising determining that a change to a directory structure requires further hydration of the directory.

17. The method of claim 16, wherein the change to the directory structure comprises a file system operation that results in an addition of a dehydrated file or folder to or a deletion of a dehydrated file or folder from the folder that is undergoing hydration.

18. The method of claim 16, wherein the determining comprises traversing parent directories when a file is created, moved, or deleted to determine if a parent is being hydrated.

19. A computer-readable storage medium comprising instructions that, when executed by a computing device, cause the computing device to perform operations comprising:
   in response to determining that a request for an operation on a folder has been received that requires a hydration of more than one file within the folder;
      initiating a process to hydrate dehydrated descendent files of the folder; and
      during the hydration process, blocking attempts to introduce new dehydrated files within the folder; and
   processing the request when the hydration is complete.

20. The computer-readable storage medium of claim 19, further comprising instructions that, when executed by a computing device, cause the computing device to perform operations comprising: implementing a communication mechanism between kernel space and user space that allows for directory information to be communicated between the kernel space and the user space.

* * * * *